United States Patent [19]
Hijikata et al.

[11] Patent Number: 5,771,065
[45] Date of Patent: Jun. 23, 1998

[54] PICTURE PHONE TERMINAL INTERRUPT FUNCTION AND PICTURE PHONE TERMINAL HAVING COMMUNICATION DISCONNECTION NOTIFYING FUNCTION

[75] Inventors: Toshiyuki Hijikata; Osamu Isono; Toshimasa Fukui; Emi Kawasaki, all of Kawasaki, Japan

[73] Assignee: Fujitsu Limited, Kanagawa, Japan

[21] Appl. No.: 712,946

[22] Filed: Sep. 13, 1996

Related U.S. Application Data

[63] Continuation of Ser. No. 349,386, Dec. 5, 1994, abandoned, which is a continuation of Ser. No. 19,088, Feb. 18, 1993, abandoned.

[30] Foreign Application Priority Data

Feb. 18, 1992 [JP] Japan .............................. HEI 4-030535
Mar. 19, 1992 [JP] Japan .............................. HEI 4-064027

[51] Int. Cl.[6] ............................................. H04N 7/14
[52] U.S. Cl. ................................................. 348/16; 348/14
[58] Field of Search ................................ 348/15, 14, 16, 348/17, 18, 19; 379/96, 94, 202, 204, 205, 206, 162, 163; 370/60, 62

[56] References Cited

U.S. PATENT DOCUMENTS

| | | | |
|---|---|---|---|
| 4,724,539 | 2/1988 | Hiskes ..................................... | 379/205 |
| 4,931,872 | 6/1990 | Stoddard et al. ......................... | 379/53 |
| 5,003,532 | 3/1991 | Ashida et al. ............................ | 348/15 |
| 5,061,992 | 10/1991 | Ueno ....................................... | 358/85 |
| 5,095,504 | 3/1992 | Nishikawa et al. ..................... | 379/162 |
| 5,099,510 | 3/1992 | Blinken, Jr. et al. ................... | 379/204 |
| 5,130,984 | 7/1992 | Cisneros ................................... | 370/60 |

FOREIGN PATENT DOCUMENTS

| | | | |
|---|---|---|---|
| 0233869 | 9/1989 | Japan ..................................... | 379/53 |
| 0040585 | 2/1991 | Japan ............................. | H04N 7/14 |
| 0098364 | 4/1991 | Japan ..................................... | 379/53 |

*Primary Examiner*—Stella Woo
*Attorney, Agent, or Firm*—Helfgott & Karas, P C.

[57] ABSTRACT

The invention provides a picture phone terminal and an exchange for use, for example, with a picture phone interrupt service system for a broadband ISDN which makes it possible to confirm, when an incoming call arrives, during communication between a plurality of picture phones, at one of the picture phone terminals from a third picture phone terminal, the incoming call during the communication without disturbing the communicating condition at present. The picture phone terminal or the exchange comprises means for receiving image information from a second picture phone terminal with which the picture phone terminal is communicating, means for receiving interrupt notifying image information representing that an incoming call from a third picture phone terminal has arrived, image composing means for composing the image information from the second picture phone terminal with which the picture phone terminal is communicating and the interrupt notifying image information from the third picture phone terminal, and display means for displaying the composite image information composed by the image composing means.

9 Claims, 27 Drawing Sheets

FIG. 4

|  | BIT 8 7 6 5 4 3 2 1 | OCTET |
|---|---|---|
| INFORMATION FACTOR IDENTIFICATION VALUE | 0 0 1 1 0 1 0 0 | 1 |
| SIGNAL CONTENT LENGTH | 0 0 0 0 0 0 0 1 | 2 |
| SIGNAL VALUE | 0 1 1 1 1 1 1 1 | 3 |

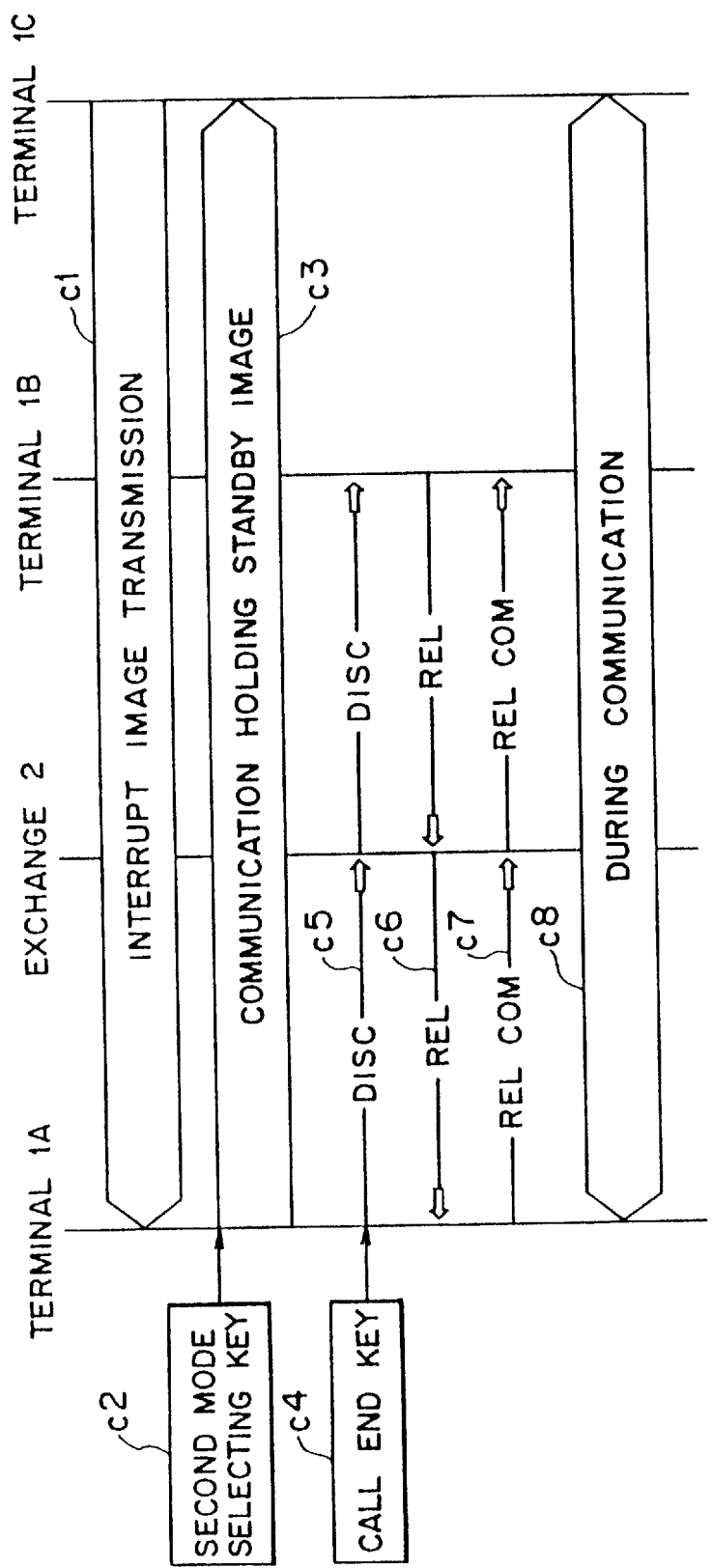

TERMINAL 1A — IMAGE OF TERMINAL 1B
TERMINAL 1B — IMAGE OF TERMINAL 1A

PICTURE PHONE TERMINAL INTERRUPT FUNCTION AND PICTURE PHONE TERMINAL HAVING COMMUNICATION DISCONNECTION NOTIFYING FUNCTION

This is a continuation of application Ser. No. 08/349,386, filed Dec. 5, 1994, now abandoned, which is in turn a continuation of application Ser. No. 08/019,088 filed Feb. 18, 1993 and now abandoned.

BACKGROUND OF THE INVENTION

This invention relates to a picture phone terminal and an exchange for use, for example, with a picture phone interrupt service system for a broadband ISDN (B-ISDN), and more particularly to a picture phone terminal having an interrupt function, a picture phone terminal having a communication disconnection notifying function and an exchange for controlling communication among three or more picture phone terminals.

In recent years, an ISDN has spread so wide that anyone can make the most of various services of sound, data, images and so forth. Further, it is estimated that, in the future, a broadband ISDN to which the technique of the ATM (Asynchronous Transfer Mode) is applied is put into practical use and spreads so wide that all media services of sound, data, moving pictures and so forth can be utilized by everyone.

Above all, common users have a high anticipation for image communications. It is considered certain that image communication terminals and image communication services will spread widely in the future, and above all, wide spread of picture phones is particularly expected by common users.

Conventionally, a so-called call waiting service has spread very wide with a common telephone system. In the call waiting service, when an incoming call from a third party arrives during talking, a notification of the incoming call is provided to the called party. The call waiting service is realized by an exchange which performs switching of incoming lines in response to hooking of a user. With regard to picture phone systems, however, the use of such call waiting service has not been realized as yet.

Meanwhile, even if a call waiting service similar to that of a common telephone system is employed in a conventional picture phone system, the call waiting service provides a notification of an incoming call irrespective of whether or not the conversation is important, and accordingly, an important conversation may sometimes be disturbed.

Further, in a broadband ISDN, communication of sound and moving pictures is performed by a picture phone system. In such picture phone system, when an incoming call from a third party arrives at one of two terminals between which communication is proceeding, if the interruption of the third party is accepted similarly as in the call waiting service of a conventional common telephone system, then the other terminal which has communicated till then is put into a holding standby condition, and in the holding standby condition, the user of the terminal is obliged to refrain from reception of any sound or image and hence obliged to have a tedious time.

By the way, in a common telephone system, a multi-party communication (three-party conference and so forth) service is provided conventionally in addition to the call waiting service. The multi-party communication service is realized by installing in an exchange a trunk for conference into which sounds of a plurality of users are introduced and in which the sounds are composed so as to provide the thus composed sound to the users.

If a broadband ISDN based on the ATM technique is put into practical use and a plurality of VCIs (Virtual Channel Identifiers) can be installed on lines so that a plurality of calls can be extended at a time while picture phones spread wide into common homes until image communications are used frequently, then such a multi-party communication service as described above will naturally be introduced into a picture phone system.

When such multi-party communication service by a picture phone system is performed, a demand for various services including, in addition to the call waiting service which allows a response to a call from a third party during communication, a service which allows attendance of a third party or conversation with a third party during calling communication, increases. While such services must necessarily be realized in multi-party communication based on image information and speech information, it has not been realized as yet.

Since about 80 percent of delivery and reception of information of a human being relies upon the sense of sight, naturally the multi-party communication by a picture phone system is higher in advantage than the conventional multi-party communication based only on speech. Accordingly, it is demanded that such services as described above can be realized with a picture phone system.

SUMMARY OF THE INVENTION

It is an object of the present invention to provide a call waiting service for use with a picture phone system which allows, when an incoming call arrives, during communication between two terminals, at one of the terminals from a third terminal, confirmation of the incoming call during the communication without disturbing the communicating condition at present.

It is another object of the present invention to provide a picture phone terminal having an interrupt function and an exchange for controlling communication among three or more picture phone terminals by which, after confirmation of a third party on an addressed terminal, acceptance or rejection of interrupting communication can be selected and the other party in a held standby condition can be prevented from feeling tedious.

It is a further object of the present invention to provide a picture phone terminal having a communication disconnection notifying function which can, when it is in a communication holding standby condition and attempts to disconnect its communication, give a notification representing the attempt.

It is a still further object of the present invention to provide an exchange for controlling communication among three or more picture phone terminals by which, when a picture phone terminal in a communication holding standby condition attempts to disconnect its communication, the picture phone terminal can give a notification representing the attempt.

It is a yet further object of the present invention to provide a picture phone terminal having an interrupt function and an exchange for controlling communication among three or more picture phone terminals which allows, in a multi-party communication service, acceptance of an incoming call from or delivery of an outgoing call to a third terminal during communication to achieve improvement in service performance.

In order to attain the objects described above, according to an aspect of the present invention, there is provided a picture phone terminal having an interrupt function, which comprises means for receiving image information from a second picture phone terminal as the other party picture phone terminal with which the picture phone terminal is communicating, means for receiving interrupt notifying image information representing that another incoming call has come from a third picture phone terminal as a further party picture phone terminal, image composing means for composing the image information from the second picture phone terminal with which the picture phone terminal is communicating and the interrupt notifying image information from the third picture phone terminal, and display means for displaying the composite information composed by the image composing means.

Preferably, the picture phone terminal further comprises selecting means for selectively designating acceptance or rejection of the interruption by the third picture phone terminal based on the composite image information displayed on the display means and for selecting priority order between the second picture phone terminal with which the picture phone terminal is communicating and the third picture phone terminal when the interruption is to be accepted.

Preferably, the picture phone terminal further comprises image storage means for storing communication holding standby information as image information in advance therein, transmitting means for transmitting the communication holding standby information, and switching means for switching the communicating condition of the picture phone terminal with the second picture phone terminal or the third picture phone terminal, and when a mode in which the third picture phone terminal takes priority over the second picture phone terminal with which the picture phone terminal is communicating is selected by the selecting means based on the composite image information displayed on the display means, the switching means may switch its communicating condition from the current communicating condition in which the picture phone terminal communicates with the second picture phone terminal to another communicating condition in which the picture phone terminal communicates with the third picture phone terminal while the transmitting means transmits the communication holding standby information stored in the image storage means to the second picture phone terminal.

Alternatively, the picture phone terminal may further comprise image storage means for storing communication holding standby information as image information in advance therein, and transmitting means for transmitting the communication holding standby information, and when a mode in which the second picture phone terminal with which the picture phone terminal is communicating takes priority over the third picture phone terminal is selected by the selecting means based on the composite image information displayed on the display means, the switching means may maintain the communicating condition at present while the transmitting means transmits the communication holding standby information stored in the image storage means to the third picture phone terminal.

Or else, the picture phone terminal may further comprise image storage means for storing communication rejection information including information of rejection of an incoming call as image information in advance therein, and transmitting means for transmitting the communication rejection information, and when a mode in which the incoming call from the third picture phone terminal is rejected is selected by the selecting means based on the composite image information displayed on the display means, the switching means may maintain the communicating condition at present while the transmitting means transmits the communication rejection information stored in the image storage means to the third picture phone terminal.

According to another aspect of the present invention, there is provided an exchange connected to at least three picture phone terminals for controlling communication of the picture phone terminals to allow communication among three or more of the picture phone terminals, which comprises image composing means for composing, when an incoming call comes, during communication between first and second ones of the picture phone terminals, to the first picture phone terminal from a third one of the picture phone terminals, image information representing that the incoming call has arrived at the first picture phone terminal from the third picture phone terminal and image information from the second picture phone terminal with which the first picture phone terminal is communicating, and means for transmitting the composite image information composed by the image composing means to the first picture phone terminal.

Preferably, the exchange further comprises image storage means for storing communication holding standby information as image information in advance therein, transmitting means for transmitting the communication holding standby information, and switching means for switching the communicating condition among three or more of the picture phone terminals, and when a notification representing that the third picture phone terminal takes priority over the second picture phone terminal with which the first picture phone terminal is communicating is received from the first picture phone terminal based on the composite image information transmitted to the first picture phone terminal, the switching means may switch its communicating condition to establish a communicating condition between the third picture phone terminal and the first picture phone terminal while the transmitting means transmits the communication holding standby information stored in the image storage means to the second picture phone terminal.

Alternatively, the exchange may comprise image storage means for storing communication holding standby information as image information in advance therein, and transmitting means for transmitting the communication holding standby information, and when a notification representing that the second picture phone terminal with which the first picture phone terminal is communicating takes priority over the third picture phone terminal is received from the first picture phone terminal based on the composite image information transmitted to the first picture phone terminal, the switching means may maintain the communicating condition at present while the transmitting means transmits the communication holding standby information stored in the image storage means to the third picture phone terminal.

Or else, the exchange may comprise image storage means for storing communication rejection information including information of rejection of an incoming call in advance therein, and transmitting means for transmitting the communication rejection information, and, when a notification representing that the incoming call from the third picture phone terminal is rejected is received from the first picture phone terminal based on the composite image information transmitted to the first picture phone terminal, the switching means may maintain the communicating condition at present while the transmitting means transmits the communication rejection information stored in the image storage means to the third picture phone terminal.

According to a further aspect of the present invention, there is provided a picture phone terminal capable of assuming a communication holding standby condition into which the picture phone terminal has been put by a first one of two picture phone terminals which are communicating with each other, which comprises means for generating communication disconnection notifying information including a message representing that the communication should be disconnected as image information, and means for transmitting, when the communication of the picture phone terminal with the first picture phone terminal should be disconnected while the picture phone terminal is in the communication holding standby condition, the communication disconnection notifying information to the first picture phone terminal side.

The transmitting means may cause the communication disconnection notifying information to be composed with image information from a second one of the two picture phone terminals which are communicating with each other so as to allow the composite image information obtained by the composition to be displayed on the first picture phone terminal. Alternatively, the transmitting means may cause the communication disconnection notifying information to be stored into the first picture phone terminal so as to allow the first picture phone terminal to display the communication disconnection notifying information after the first picture phone terminal ends the communication with the second picture phone terminal.

According to a still further aspect of the present invention, there is provided a picture phone terminal having an interrupt function, which comprises means for receiving image information and sound information from one or more second picture phone terminal or terminals with which the picture phone terminal is communicating, means for accepting, when an incoming call comes from a third picture phone terminal to the picture phone terminal during communication with the second picture phone terminal or terminals, the interrupting incoming call from the third picture phone terminal, means for receiving, when the interrupting incoming call from the third picture phone terminal is accepted, image information and sound information from the third picture phone terminal, inputting means for inputting image information and sound information as information from the picture phone terminal, image and sound composing means for composing the image information and the sound information from the inputting means and the image information and the sound information received from the second and third picture phone terminals, respectively, means for displaying and/or outputting the composite information composed by the image and sound composing means, and means for transmitting the composite information composed by the image and sound composing means individually to the second and third picture phone terminals.

Preferably, the image and sound composing means composes the image information and the sound information from all of the picture phone terminal and the second and third picture phone terminals with which the picture phone terminal is communicating.

According to a yet further aspect of the present invention, there is provided a picture phone terminal having an interrupt function, which comprises means for receiving image information and sound information from one or more second picture phone terminal or terminals with which the picture phone terminal is communicating, means for delivering an outgoing call to a third picture phone terminal during communication of the picture phone terminal, means for receiving, when the third picture phone terminal accepts the outgoing call of the picture phone terminal, image information and sound information from the third picture phone terminal, inputting means for inputting image information and sound information as information from the picture phone terminal, image and sound composing means for composing the image information and the sound information inputted from the inputting means and the image information and the sound information from the second and third picture phone terminals, respectively, means for displaying and/or outputting the composite information composed by the image and sound composing means, and means for transmitting the composite information composed by the image and sound composing means individually to the second and third picture phone terminals.

Preferably, the image and sound composing means composes the image information and the sound information from all of the picture phone terminal and the second and third picture phone terminals with which the picture phone terminal is communicating.

According to a yet further aspect of the present invention, there is provided an exchange connected to at least three picture phone terminals for controlling communication of the picture phone terminals to allow communication among three or more of the picture phone terminals, which comprises image and sound composing means for composing, when an Incoming call comes, during communication of two or more of the picture phone terminals, from a third one of the picture phone terminals to a first one of the two or more picture phone terminals and then the first picture phone terminal accepts the incoming call from the third picture phone terminal, respective image information and respective sound information from the two or more picture phone terminals and the third picture phone terminal, and means for transmitting the composite information composed by the image and sound composing means to the two or more picture phone terminals and the third picture phone terminal.

The image and sound composing means may compose the respective image information and the respective sound information from all of the two or more picture phone terminals and the third picture phone terminals among which the communication is proceeding.

According to a yet further aspect of the present invention, there is provided an exchange connected to at least three picture phone terminals for controlling communication of the picture phone terminals to allow communication among three or more of the picture phone terminals, which comprises image and sound composing means for composing, when a first one of two or more of the picture phone terminals delivers, during communication of the two or more picture phone terminals, a third one of the picture phone terminals and then the third picture phone terminal accepts the incoming call from the first picture phone terminal, respective image information and respective sound information from the two or more picture phone terminals and the third picture phone terminal, and means for transmitting the composite information composed by the image and sound composing means to the two or more picture phone terminals and the third picture phone terminal.

The image and sound composing means may compose the respective image information and the respective sound information from all of the two or more picture phone terminals and the third picture phone terminals among which the communication is proceeding.

With the picture phone terminals having an interrupt function and the exchanges for controlling communication among three or more picture phone terminals, when an incoming call (interruption) arrives, during communication between first and second ones of the picture phone terminals, at the first picture phone terminal from a third picture phone terminal, a notification of the incoming call from the third picture phone terminal is transmitted in the form of a composed image to the first picture phone terminal. Consequently, the user of the first picture phone terminal can discriminate it without disturbing the communicating condition at present from whom the incoming call originates. Accordingly, the user of the first picture phone terminal can determine immediately whether the interrupting incoming call should take priority or the communication with the second picture phone terminal with which the first picture phone terminal is communicating at present should take priority.

Further, whether the interrupting incoming call from the third picture phone terminal should be accepted or rejected and, when the interrupting incoming call is to be accepted, the priority order between the second picture phone terminal with which the first picture phone terminal is communicating at present and the third picture phone terminal of the incoming call, can be selectively designated by the selecting means based on the display of the composed image. Accordingly, any of various modes including interruption communication, maintenance of communication with the second party and rejection of interruption communication can be selected arbitrarily based on the determination of the user of the first picture phone terminal.

Furthermore, since the communication holding standby information is transmitted as image information to the second or third picture phone terminal which has been put into a communication holding standby condition as a result of the mode selection, the tedious feeling of the user of the second or third picture phone terminal during waiting can be moderated. Further, when the communication rejection information registered in advance is transmitted to the third picture phone terminal whose request for interruption has been rejected by the first picture phone terminal, the communicating condition at present can be maintained and the important conversation is not interrupted.

Besides, with the picture phone terminals having an interrupt function, when the picture phone terminal which has been put into a communication holding standby condition attempts, in the communication holding waiting condition, to disconnect the communication by some reason, it can transmit communication disconnection notifying information to the first picture phone terminal, by which the second picture phone terminal has been put into the communication holding standby condition, to make a declaration of its will that the communication has been disconnected. Consequently, there is an advantage that a loss of time and a charge required for image communication during holding can be saved.

Further, with the picture phone terminals having an interrupt function and the exchanges for controlling communication among three or more picture phone terminals, if, during communication between first and second picture phone terminals, an incoming call from or an outgoing call to a third picture phone terminal arrives at or is delivered from the first picture phone terminal and the incoming or outgoing call is accepted, then each of the first, second and third picture phone terminals outputs composite information composed from image information and sound information at least from the first to third picture phone terminals except the picture phone terminal itself. Accordingly, occurrence of ineffective calls can be minimized and significant improvement in service performance can be realized.

In this instance, where the image and sound composing means is provided on the picture phone terminal side, multi-party communication can be performed in accordance with an ordinary calling procedure between each of the picture phone terminals and the network, and consequently, otherwise possible complexity of the software processing in the exchange can be avoided. On the other hand, where the image and sound composing means is provided on the exchange side, multi-party communication service can be realized without providing new special parts for each of the picture phone terminals.

It is to be noted that, while the picture phone terminals described above preferably process and display a moving picture as an image, they may otherwise process and display a still picture as an image.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIG. 4 is a diagrammatic view showing detailed configuration of a signal information factor included in an ALERT signal in the first embodiment;

FIG. 7 is a diagram showing a signal sequence illustrating operation of the first embodiment in a second mode:

DESCRIPTION OF THE PREFERRED EMBODIMENTS

A. First Embodiment

Figure 1:
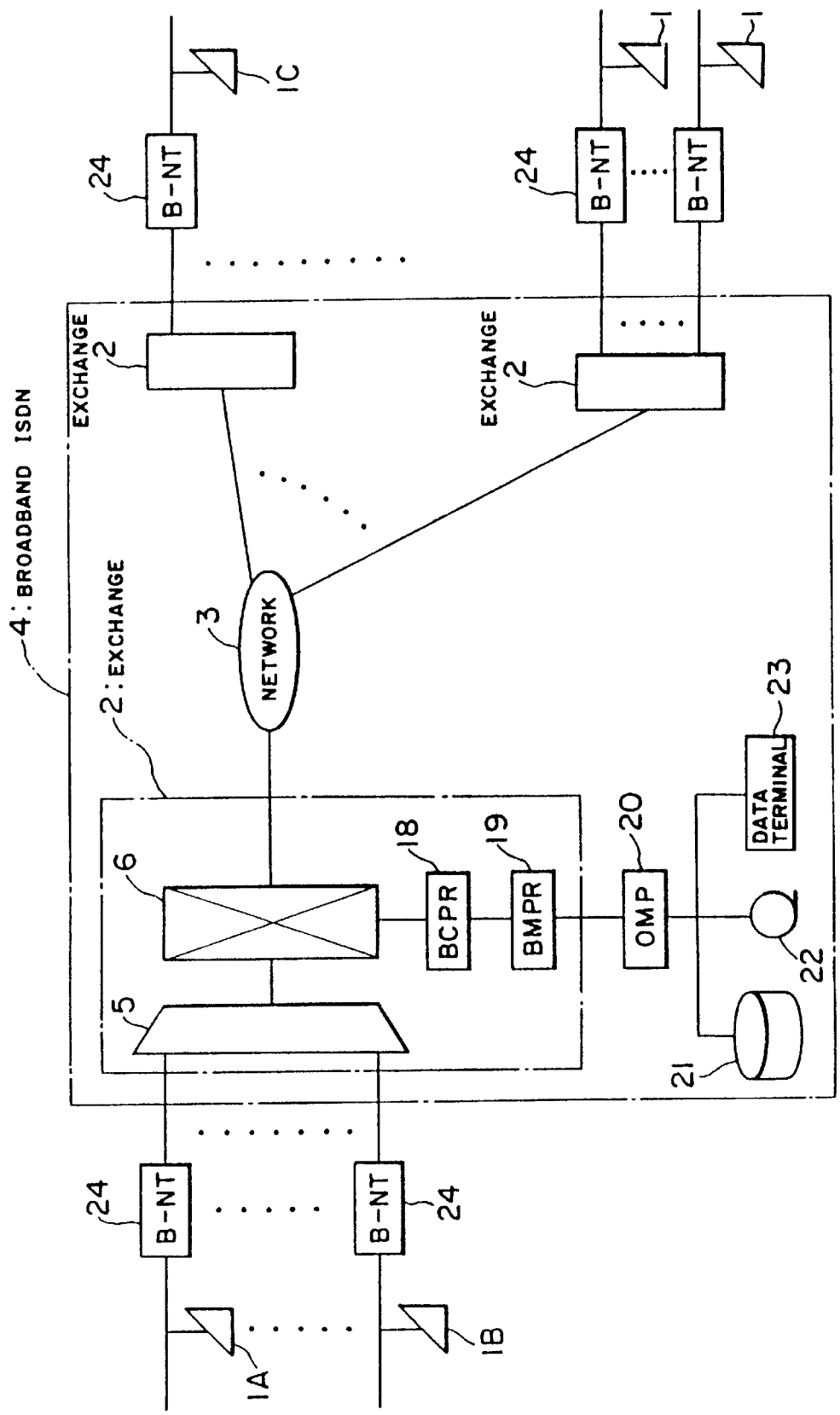
FIG. 1 is a block diagram showing a first preferred embodiment of the present invention.

Referring first to FIG. 1, there is shown a first preferred embodiment of the present invention. The present embodiment shown includes a plurality of picture phone terminals 1, among which those denoted specifically at 1A, 1B and 1C serve, in description of operation, as first, second and third picture phone terminals, respectively, for convenience of description. A broadband ISDN 4 is interposed among the picture phone terminals 1 and 1A to 1C, thereby constituting an image communication system for a call waiting service function as a picture phone interrupt service system. The broadband ISDN 4 includes a plurality of exchanges 2 having an exchanging function which allow communication among the picture phone terminals 1 and 1A to 1C, and a network 3 interconnecting the exchanges 2.

Each of the exchanges 2 in the present embodiment includes a multiplexer/demultiplexer 5, an ATM switch module 6, a broadband call processor (hereinafter referred to as BCPR) 18, and a broadband main processor (hereinafter referred to as BMPR) 19. The BCPR 18 includes a main controller (CC) and a main storage device (MM) not shown and controls operation of the ATM switch module 6. Meanwhile, an operation and maintenance processor (hereinafter referred to as OMP) 20 is connected to the BCPR 18 by way of the BMPR 19 so that supervisory of an operating condition and maintenance of the exchange 2 may be performed by the OMP 20.

A data base 21 for storing data therein, a magnetic tape apparatus 22 and a data terminal 23 serving as a man-machine interface are provided for the OMP 20. Further, the picture phone terminals 1, 1A to 1C are connected to the exchanges 2 by way of respective broadband network terminations (hereinafter referred to as B-NTs) 24.

Figure 2:
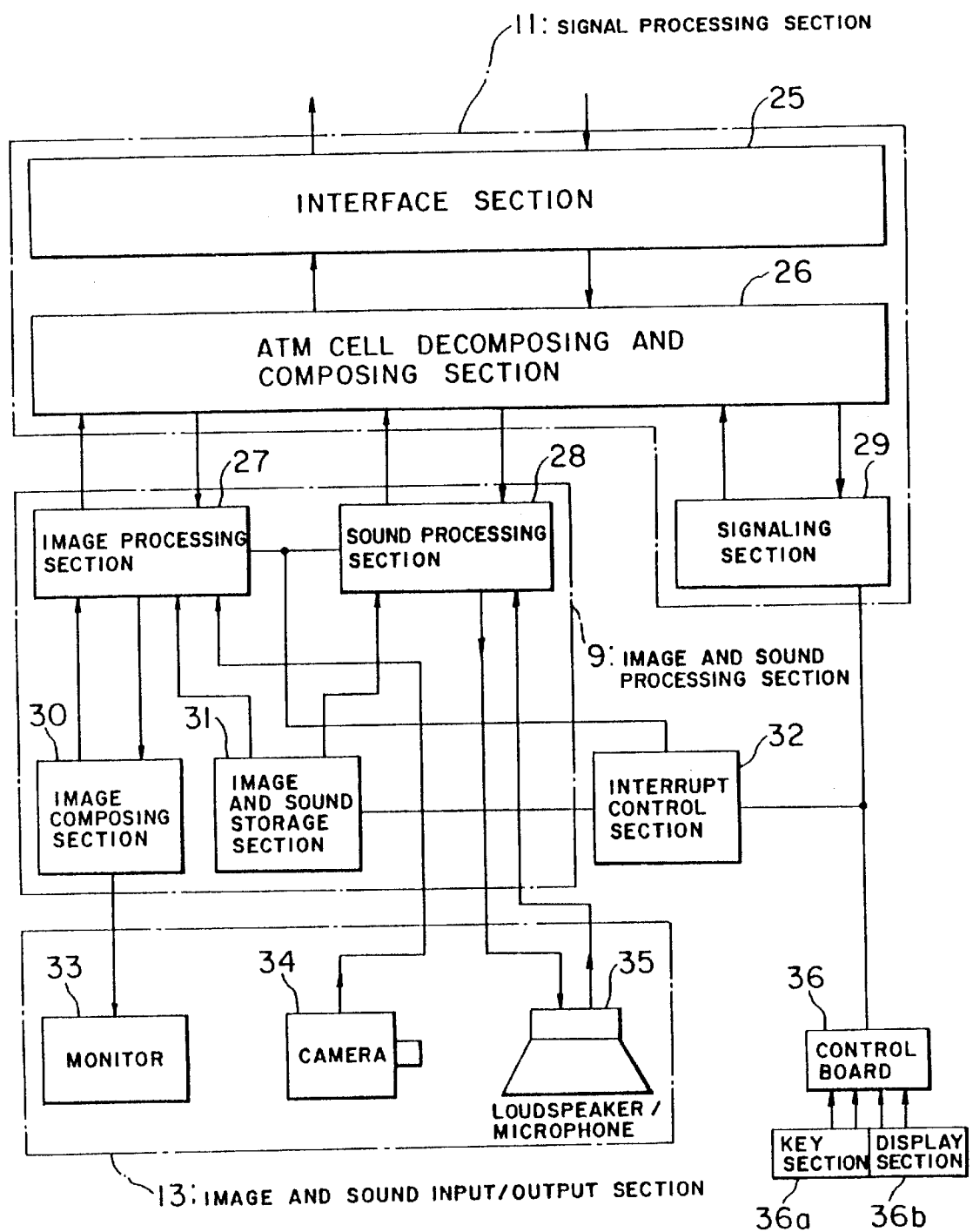
FIG. 2 is a block diagram showing detailed construction of a picture phone terminal employed in the first embodiment of FIG. 1.

The picture phone terminals 1A to 1C used in the first embodiment are shown in more detail in FIG. 2. Referring to FIG. 2, each of the picture phone terminals 1 and 1A to 1C includes an image and sound processing section 9, an interrupt control section 32, a signal processing section 11, a control board 36, and an image and sound input/output section 13.

The signal processing section 11 includes an interface section 25 having an interface function of transmitting and receiving an information signal, a control signal and so forth to and from the broadband ISDN 4 (exchange 2), an ATM cell decomposing and composing section 26 for decomposing an ATM cell (consisting of a header of 5 bytes and an information field of 48 bytes) from the interface section 25 and sending out thus obtained data to pertaining processing sections and for composing and multiplexing data from the processing sections of the terminal into an ATM cell and sending out the ATM cell to the interface section 25, and a signaling section 29 for controlling processing of a call such as an outgoing call or an incoming call to or from the broadband ISDN 4 (exchange 2).

The image and sound processing section 9 includes an image processing section 27 for converting image data from digital into analog data or vice versa, a sound processing section 28 for converting sound data from digital into analog data or vice versa, an image composing section serving as image composing means 30 for normally generating an image of the other party during communication but composing, when an interruption occurs, an image of the other party during communication and an interrupt image (interrupt disconnection notifying information), an image and sound storage section 31 serving as image storage means in which communication holding standby information and communication acceptance/rejection information produced in advance are registered, and an interrupt control section 32 for controlling processing designated from a control board 36 in response to a request for interruption. Meanwhile, the image and sound input/output section 13 includes a monitor 33 serving as display means for displaying thereon image information from the image composing section 30, a camera 34 for imaging a user of the picture phone terminal, and a loudspeaker/microphone 35 for outputting and inputting sound for communication with the other party.

In the present embodiment, the signal processing section 11 has a function of receiving image information from a picture phone terminal with which the picture phone terminal is communicating at present, another function of receiving interrupt notifying image information representing that an incoming call has arrived from a third picture phone terminal, a further function of transmitting communication holding standby information or/and communication rejection information stored in the image and sound storage section 31, and a still further function as switching means for switching the communicating condition among three or more picture phone terminals.

The picture phone terminal shown in FIG. 2 further includes the control board 36 including a key section 36a having various keys including digit keys, a plurality of mode selecting keys each provided for selection of a mode, and function keys including a function key for ending or interrupting the current communication with the other party, and a display section 36b for displaying thereon condition information of a call from the signaling section 29. Thus, when the key section 36a is manually operated, a corresponding signal for controlling the signaling section 29 and the interrupt control section 32 is generated from the control board 36.

The control board 36 in the present embodiment functions as selecting means for selectively designating acceptance or rejection of the interruption by a third picture phone terminal based on composite image information displayed on the monitor 33 and, when the interruption is to be accepted, the priority order between the second picture phone terminal with which the picture phone terminal is communicating and the third picture phone terminal.

Figure 3:
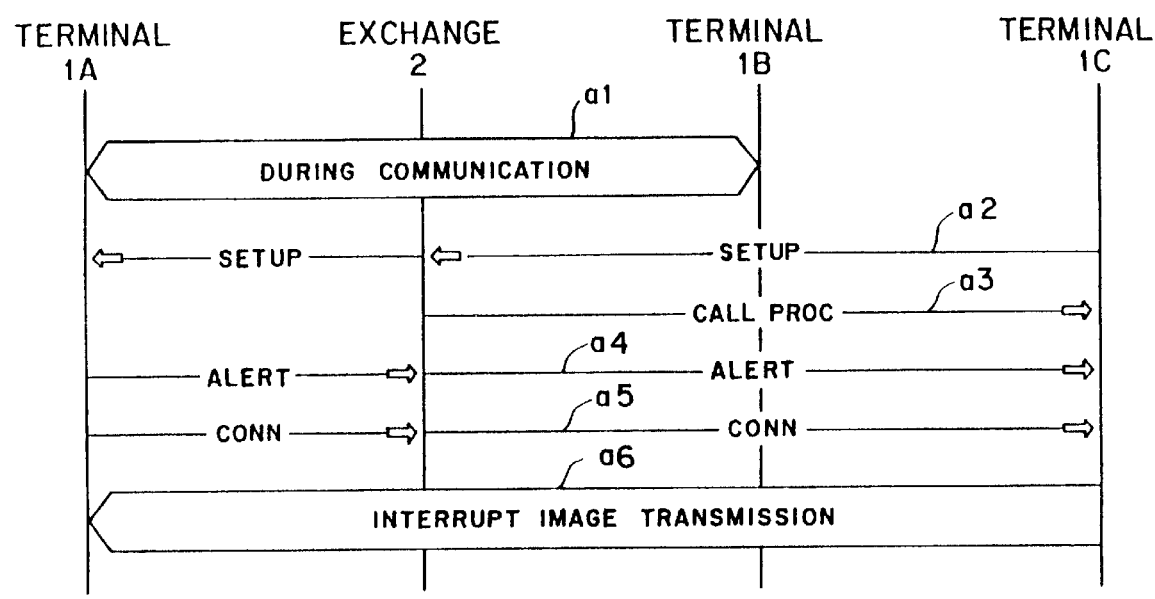
FIG. 3 is a diagram showing an interrupt sequence of the first embodiment during communication.

FIG. 3 shows an interrupt sequence of the first embodiment during communication. Referring to FIG. 3, the terminals 1A, 1B and 1C are each in the form of a picture phone terminal having the construction shown in FIG. 2 and described above, and correspond to the picture phone terminals 1A to 1C shown in FIG. 1, respectively, while the exchange 2 corresponds to the broadband ISDN (refer to reference numeral 4 in FIG. 1).

For call control of the picture phone terminals 1A to 1C in the broadband ISDN, a call control procedure (layer 3) is employed similarly as in a conventional ISDN (narrow band ISDN). If, when the terminals 1A and 1B are first in a mutually communicating condition (a1 in FIG. 3), the terminal 1C transmits a SETUP (call setting message) signal addressing the terminal 1A (a2 in FIG. 3), the exchange 2 receiving the SETUP signal sends out the call setting message to the terminal 1A and delivers a CALL PROC (Call Proceeding: a message representing that processing for setting a call is proceeding) signal to the terminal 1C (a3 in FIG. 3).

Consequently, the terminal 1A soon generates an ALERT (Alerting: a message representing that a called party is being called) signal. In this instance, the terminal 1A adds a "signal information facto" (which will be hereinafter described with reference to FIG. 4) to the message and notifies the terminal 1C with the "signal information factor" representing that the terminal 1A is in a communicating condition at present (a4 in FIG. 3). If the terminal 1A responds to the call, then it generates a CONN (Connect: a message representing that the called party has responded) signal (a5 in FIG. 3). When the terminal 1C receives the CONN signal, although it has identified from the signal information factor of the ALERT signal described above that the terminal 1A is in a communicating condition, it transmits an interrupt image (interrupt notifying image information) to the terminal 1A. The image is received by the terminal 1A (a6 in FIG. 3).

Detailed construction of the signal information factor included in the ALERT signal transmitted from the terminal 1A to the terminal 1C is shown in FIG. 4. Referring to FIG. 4, an octet representative of a code for notification of a communicating condition is set as an information factor identification value, and other two octets of such constructions as shown in FIG. 4 are set as a signal content length and a signal length.

If a call of request for interruption to the terminal 1A is generated in accordance with the interrupt sequence shown in FIG. 3 and an interrupt image is received by the terminal 1A, then one of three operation sequences (FIGS. 5. 7 and 9) described below is selectively executed in response to a mode selected by the user of the terminal 1A.

Operation of the first embodiment in a first mode illustrated in FIG. 5 will first be described with reference to FIGS. 2 and 6(a) to 6(d), which show variations of display images of the terminals 1A to 1C at several stages of FIG. 5.

Figure 5:
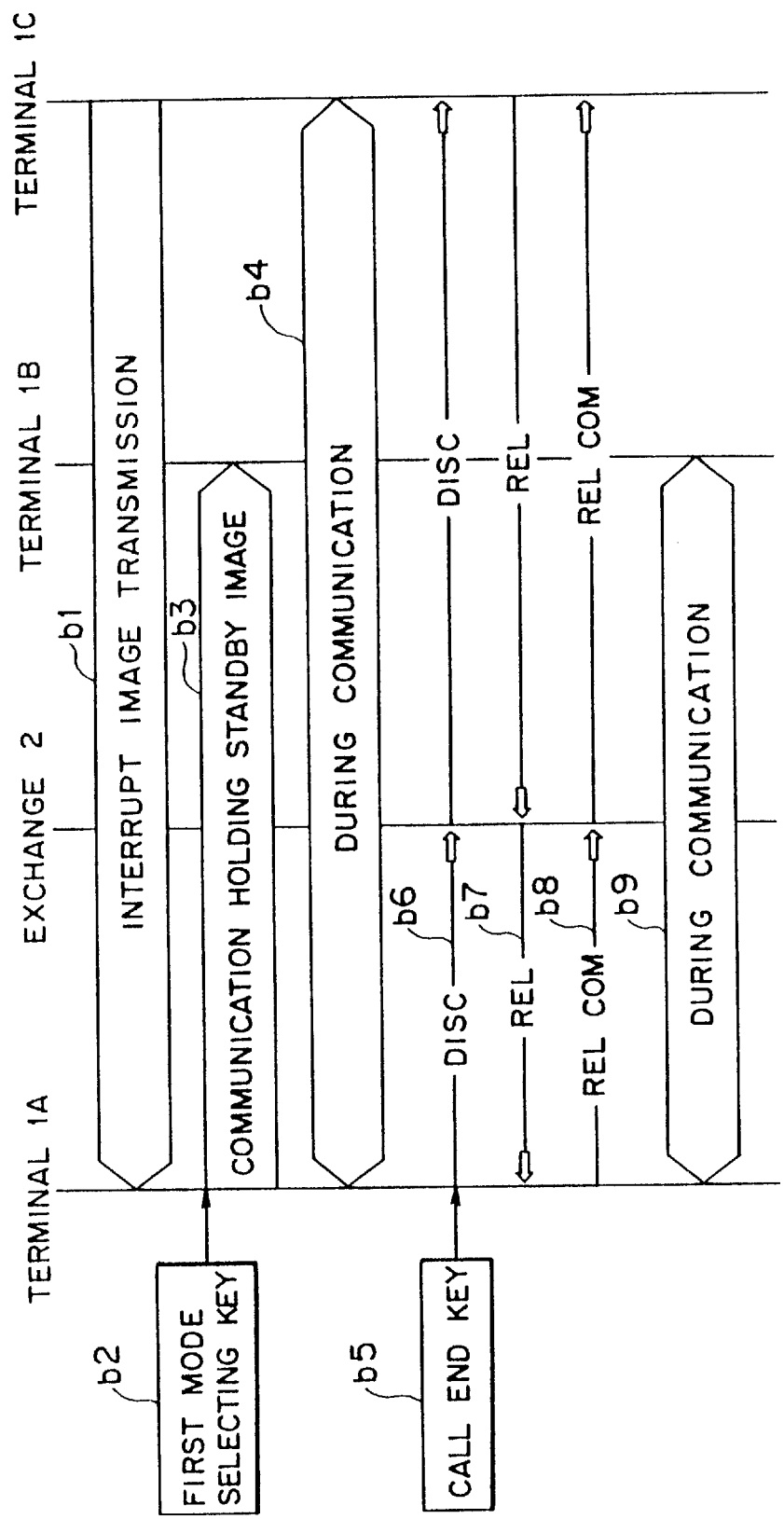
FIG. 5 is a diagram showing a signal sequence of the first embodiment in operation in a first mode.
Figure 6A:
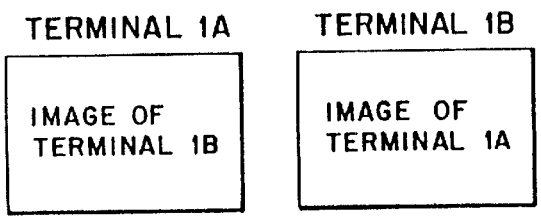
FIGS. 6(a) to 6(d) are schematic views illustrating variations of display images of terminals at different stages of FIG. 5.
Figure 6B:
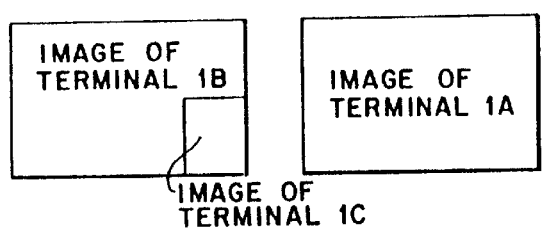

First, each of the terminals 1A and 1B displays an image of the other party relative to each other as seen in FIG. 6(a). If an interrupt image from the terminal 1C is received in this condition as shown in FIG. 5 (b1 in FIG. 5), then in the terminal 1A, which has the construction shown in FIG. 2, the image composing section 30 composes an image from the terminal 1B inputted thereto from the image processing section 27 and the interrupt image from the terminal 1C and displays the thus composed image on the monitor 33. In the composed image, the image from the terminal 1C is displayed in a reduced scale at a corner portion of the screen of the monitor 33 of the terminal 1A together with the image of the terminal 1B which is displayed at the remaining part of the screen of the monitor 33 as shown in FIG. 6(b).

Looking at the composed image, the user of the terminal 1A will confirm a user of the interrupting terminal 1C, and then, when the user of the terminal 1A wants to first perform communication with the terminal 1C immediately and then communicate with the terminal 1B, the user will selectively operate a first mode selecting key of the key section 36a manually (b2 of FIG. 5). Consequently, the interrupt control section 32 is activated and executes control of the corresponding first mode.

Figure 6C:

In this instance, the communication holding standby image (image of the face of the user of the terminal 1A and/or a message) and the sound stored in the image and sound storage section 31 are outputted to the image processing section 27 and the sound processing section 28, respectively. Consequently, the communication holding standby image and the sound are sent out by way of the ATM cell decomposing and composing section 26 and the interface section 25 toward the terminal 1B (b3 of FIG. 5). At the terminal 1B, the communication holding standby image is displayed (the sound is outputted from the loudspeaker). Thereafter, the image from the terminal 1C is displayed on the terminal 1A while an image of the terminal 1A is sent out to and displayed on the terminal 1C which is the source of the request for interruption, thereby establishing a communicating condition between the terminals 1A and 1C (b4 of FIG. 5). In this instance, the images are displayed on the terminals 1A to 1C in such a manner as shown in FIG. 6(c).

When the communication between the terminals 1A and 1C comes to an end, the user of the terminal 1A will manually operate a call end key of the key section 36a of the control board 36 (b5 in FIG. 5). Consequently, a DISC (Disconnect: a message requesting release of the call) signal is generated from the signaling section 29 of the terminal 1A and transmitted to the terminal 1C by way of the exchange 2 (broadband ISDN 4) (b6 in FIG. 5).

Figure 6D:
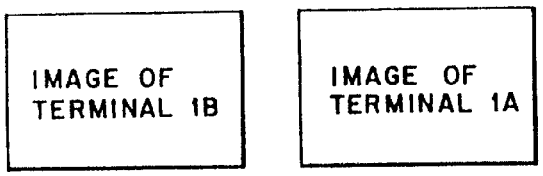

Upon reception of the DISC signal, the terminal 1C sends out a REL (Release: a message requesting disconnection of the channel and release of the call number) signal (b7 in FIG. 5). The terminal 1A receives the REL signal and sends out a REL COM (Release Complete: a message of notification of completion of disconnection of the channel and release of the call number) to the terminal 1C, and consequently, the communication between the terminals 1A and 1C is released (b8 of FIG. 5). Thereafter, the terminal 1A resumes the communication with the terminal 1B under the control of the interrupt control section 32 (b9 of FIG. 5). Images of the terminals 1A and 1B in this condition are shown in FIG. 6(d).

Subsequently, operation of the first embodiment in a second mode illustrated in FIG. 7 will be described with reference to FIGS. 8(a) to 8(d), which show variations of display screens of the terminals 1A to 1C at several stages of FIG. 7.

Figure 8A:
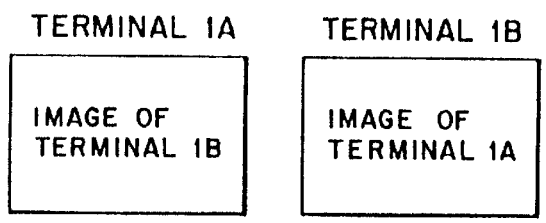
FIGS. 8(a) to 8(d) are schematic views illustrating variations of display images of the terminals at different stages of FIG. 7.
Figure 8B:
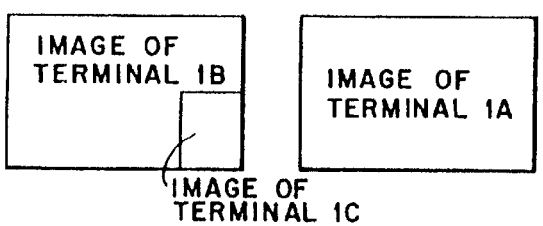

First, if an interrupt image from the terminal 1C is received (cl in FIG. 7) when the terminals 1A and 1B are in a mutually communicating condition as seen from FIG. 8(a), then the terminal 1A composes the image from the terminal 1B and the interrupt image from the terminal 1C as described hereinabove with reference to FIG. 5 and displays the thus composed image on the monitor 33 as shown in FIG. 8(b). Looking at the composed image, the user of the terminal 1A will confirm a user of the interrupting terminal 1C, and if the user of the terminal 1A wants to preferentially continue the communication with the terminal 1B and thereafter communicate with the terminal 1C, then the user will selectively operate a second mode key of the key section 36a of the control board 36 manually (c2 of FIG. 7).

Figure 8C:
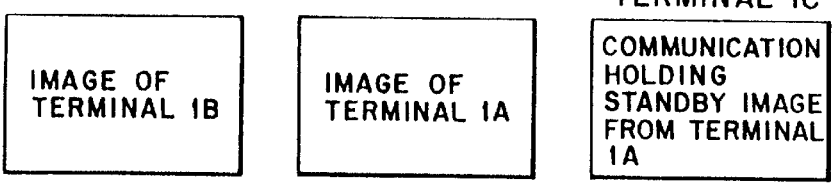

Consequently, the interrupt control section 32 of FIG. 2 is activated to execute control of the corresponding second mode. In particular, the communication holding standby image stored in the image and sound storage section 31 of FIG. 4 (an image and sound different from those of the case of FIG. 5 may be used instead) is transmitted to the terminal 1C (c3 in FIG. 7) so that the communication holding standby image is displayed on the monitor of the terminal 1C (sound is outputted from the loudspeaker). Thereafter, communication is performed between the terminals 1A and 1B similarly as before. In this instance, images are displayed on the terminals 1A to 1C as shown in FIG. 8(c).

Figure 8D:

When the communication between the terminals 1A and 1B thereafter comes to an end, the user of the terminal 1A will manually operate the call end key of the key section 36a of the control board 36 (c4 in FIG. 7). Consequently, communication of control messages similar to those in the case of the first mode of FIG. 5 is performed. In this instance, however, those messages are transmitted to the terminal 1B with which the terminal 1A has performed the communication till then. In particular, a DISC signal is generated from the terminal 1A and transmitted to the terminal 1B by way of the exchange 2 (c5 of FIG. 7). Upon reception of the DISC signal, the terminal 1B sends out a REL signal (c6 in FIG. 7). The terminal 1A receives the REL signal and transmits a REL COM signal to the terminal 1B so that the communication between the terminals 1A and 1B is released (c7 in FIG. 7). Thereafter, the terminal 1A starts communication with the terminal 1C under the control of the interrupt control section 32 (c8 of FIG. 7). Images of the terminals 1A and 1C in this condition are shown in FIG. 8(d).

Figure 9:
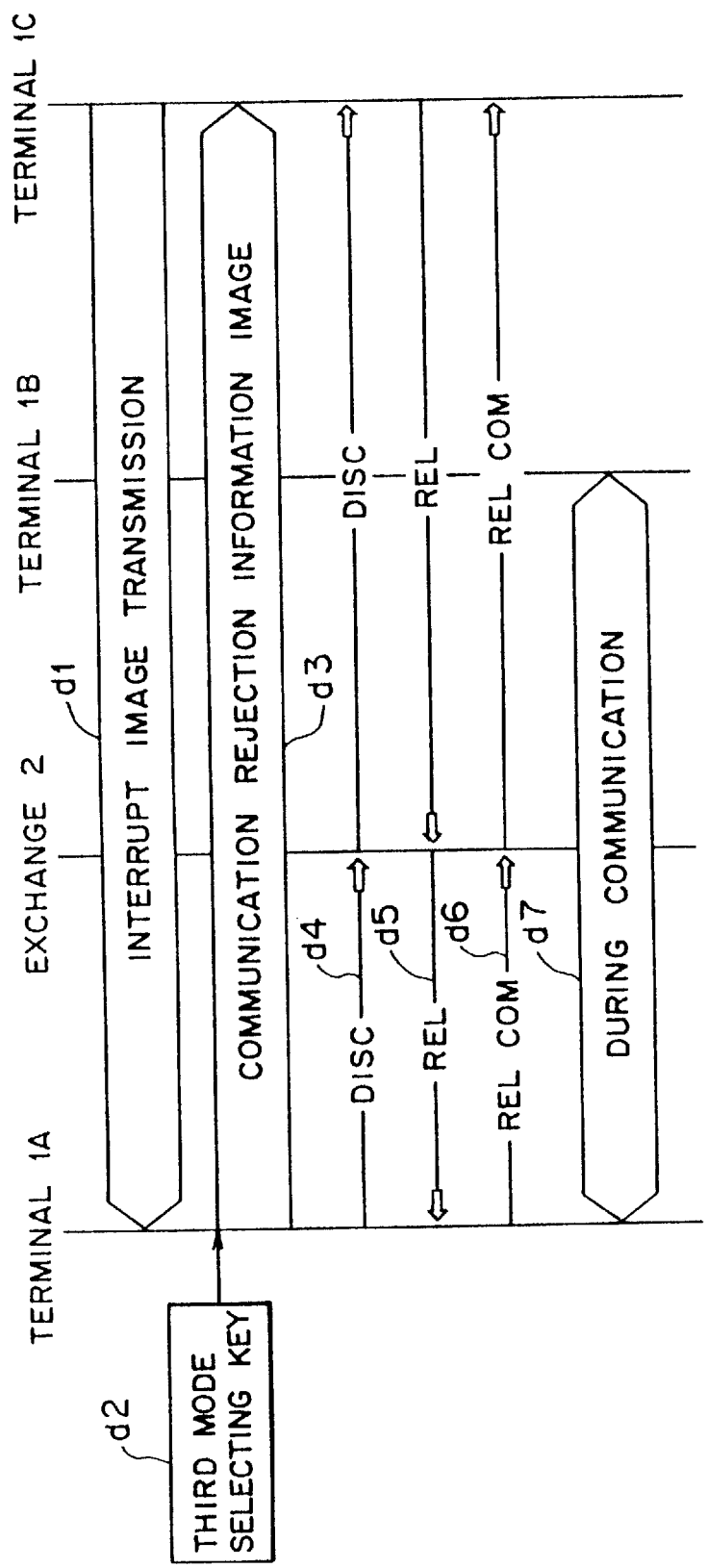
FIG. 9 is a diagram showing a signal sequence illustrating operation of the first embodiment in a third mode.

Subsequently, operation of the first embodiment in a third mode illustrated in FIG. 9 will be described with reference to FIGS. 10(a) to 10(c), which illustrate variations of display images of the terminals 1A and 1C at several stages of FIG. 9.

Figure 10A:
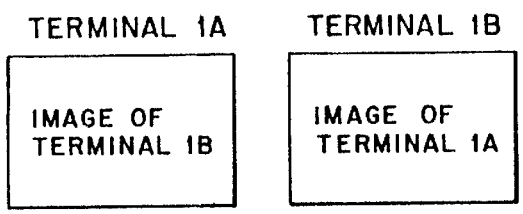
FIGS. 10(a) to 10(c) are schematic views illustrating variations of display images of the terminals at different stages of FIG. 9.
Figure 10B:
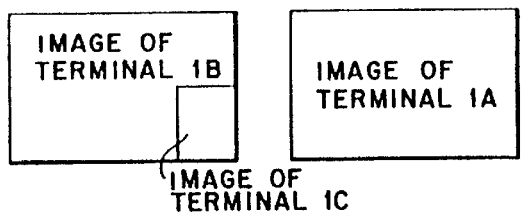

First, if an interrupt image from the terminal 1C is received (d1 in FIG. 9) when the terminals 1A and 1B are in a mutually communicating condition as shown in FIG. 10(a) similarly as in the cases of FIGS. 5 and 7, then the terminal 1A composes an image from the terminal 1B and the interrupt image from the terminal 1C and displays the thus composed image on the monitor 33 as shown in FIG. 10(b). Looking at the composed image, the user of the terminal 1A will confirm a user of the interrupting terminal 1C, and if the user of the terminal 1A wants to continue the communication with the terminal 1B and reject communication with the terminal 1C, the user will selectively operate a third mode key of the key section 36a of the control board 36 manually (d2 of FIG. 9).

Consequently, the interrupt control section 32 of FIG. 2 is activated to execute control of the corresponding third mode. In particular, the communication rejection information stored in the image and sound storage section 31 of FIG. 2 (an image and sound which indicate that the call cannot be accepted at present) is transmitted to the terminal 1C (d3 in FIG. 9) so that the communication rejection image is displayed on the monitor of the terminal 1C (sound is outputted from the loudspeaker). In this instance, images are displayed on the terminals 1A to 1C as shown in FIG. 10(c).

Thereafter, communication of control messages are performed between the terminals 1A and 1C. In particular, a DISC signal is transmitted from the terminal 1A to the terminal 1C (d4 of FIG. 9). Upon reception of the DISC signal, the terminal 1C sends out a REL signal (d5 in FIG. 9). The terminal 1A receives the REL signal and transmits a REL COM signal to the terminal 1C. Consequently, the communication between the terminals 1A and 1C is released (d6 in FIG. 9). Thereafter, the terminal 1A restores the communicating condition with the terminal 1B under the control of the interrupt control section 32 (d7 of FIG. 9). Images of the terminals 1A and 1B in this instance are similar to those shown in FIG. 10(a).

In this manner, with the first embodiment of the present invention, if an incoming call (interruption) occurs, during communication between two picture phone terminals 1A and 1B, from a third picture phone terminal 1C addressing one of the picture phone terminals 1A and 1B, for example, the terminal 1A, a notification of the incoming call from the picture phone terminal 1C is delivered in the form of a composed image to the terminal 1A of the addressee. Consequently, a user of the terminal 1A can identify the addresser without disturbing the communicating condition at present. Accordingly, the user can immediately determine whether the interrupting call should be selected in priority or the communication with the other party at present should be selected in priority.

Further, the user can select, in accordance with a result of the determination, a mode of interrupt communication, communication with the formerly other party or acceptance or rejection of interrupt communication by manually and selectively operating the key section 36a of the control board (selecting means) 36. Further, since a communication holding standby image is transmitted to the other terminal 1B or 1C which is put into a communication holding standby condition as a result of the selection of a mode, the tedious feeling of the party to enter into the holding standby condition can be moderated. On the other hand, since communication rejection information registered in advance is transmitted to the party whose request for interruption is to be rejected, the important conversation will not be interrupted.

B. Second Embodiment

Figure 11:
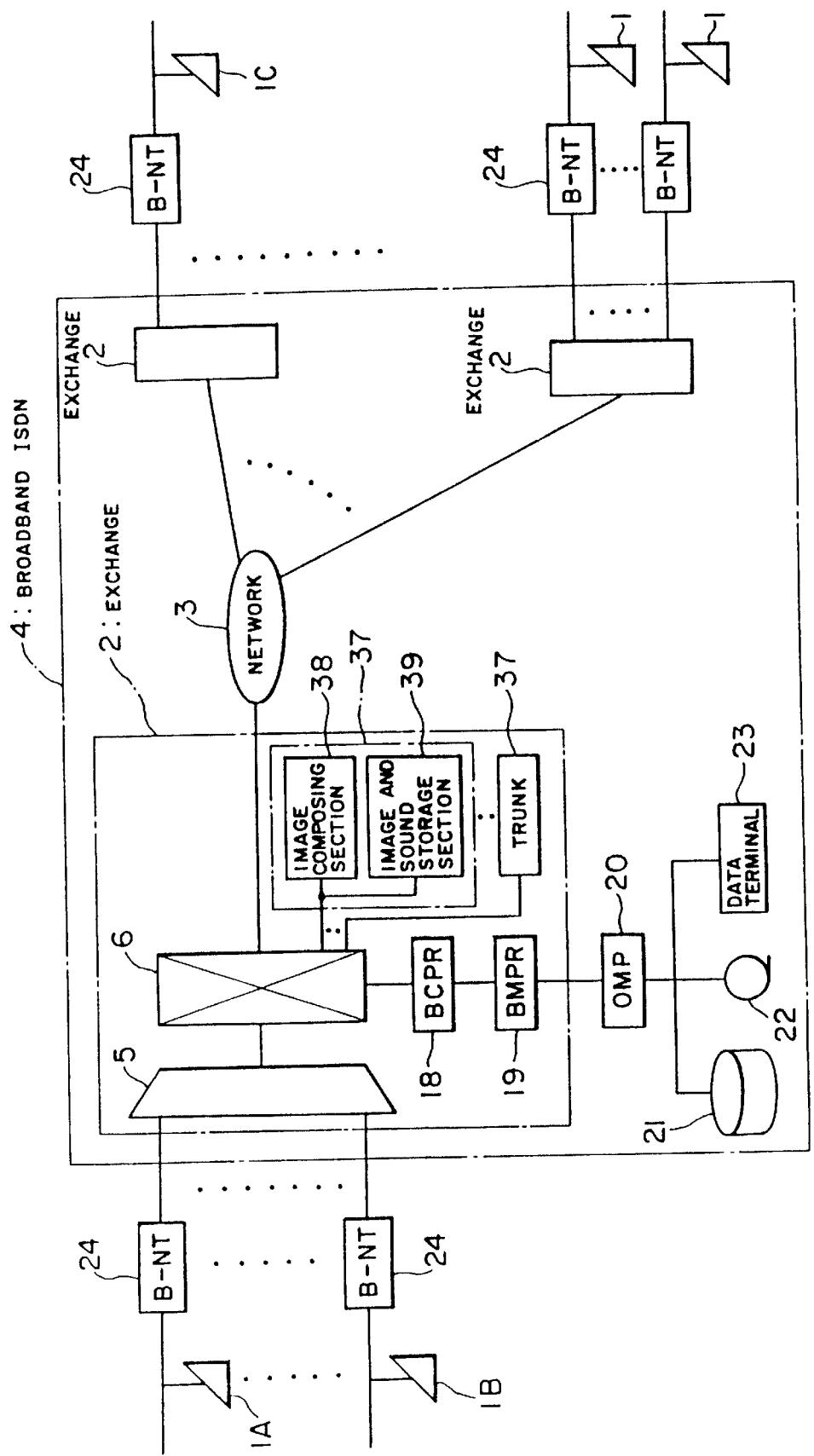
FIG. 11 is a block diagram showing a second preferred embodiment of the present invention.
Figure 12:
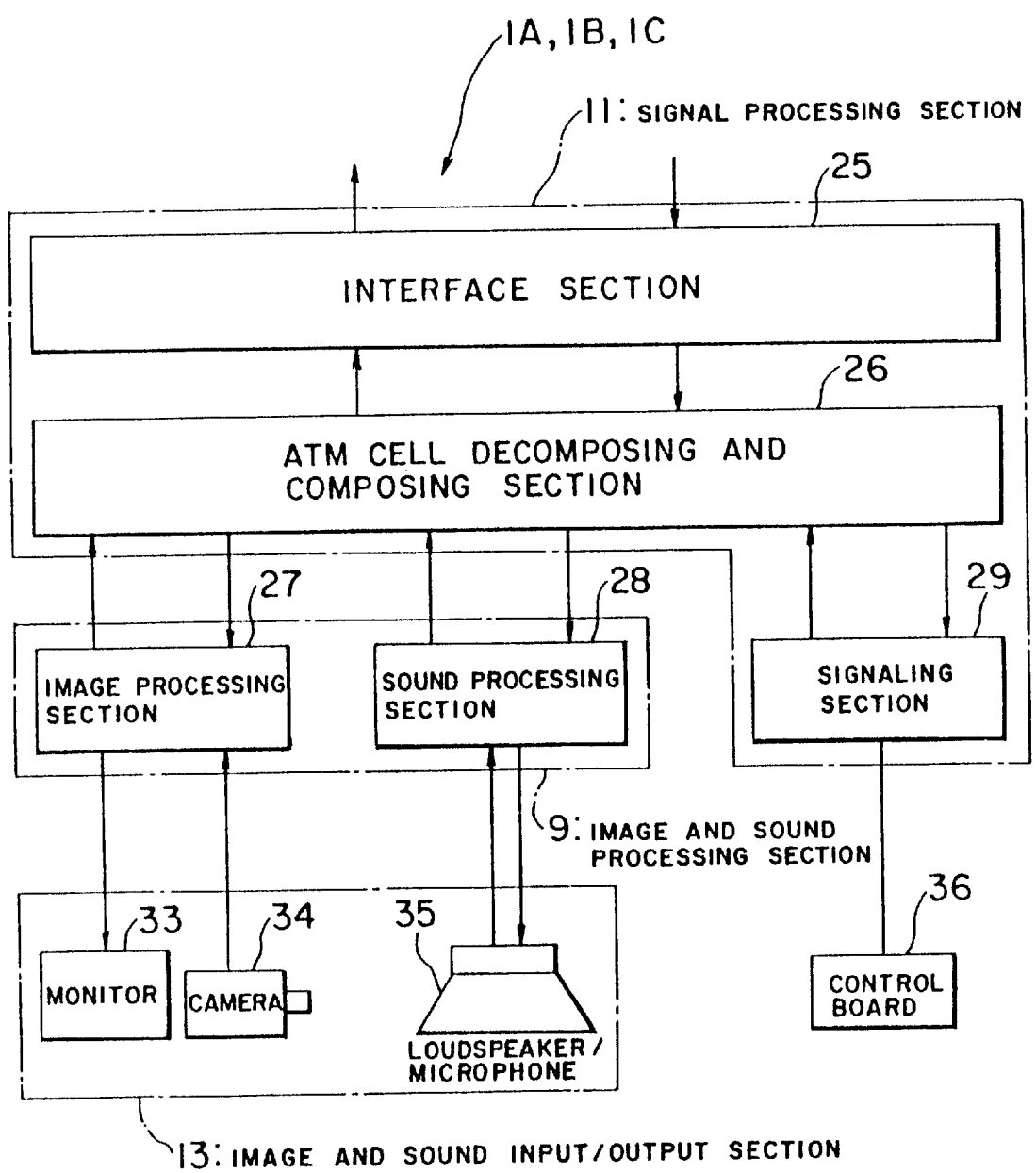
FIG. 12 is a block diagram showing detailed construction of a picture phone terminal employed in the second embodiment.

FIG. 11 shows a second preferred embodiment of the present invention, and FIG. 12 shows detailed construction of a picture phone terminal used in the embodiment of FIG. 11. Referring to FIGS. 11 and 12, the image communication system and the picture phone terminal in the second embodiment are modifications to and include several common components to those of the image communication system and the picture phone terminal of the first embodiment shown in FIGS. 1 and 2, respectively. Overlapping description of the common components, which are denoted by like reference characters, is omitted herein to avoid redundancy.

The image communication system in the present second embodiment is different from the image communication system in the preceding embodiment in that each of the exchanges 2 has, in addition to the exchanging function of allowing communication between the picture phone terminals 1A to 1C, a call waiting service function as a picture phone interrupt service function.

Accordingly, in order to allow the exchange 2 to perform the call waiting service function, each of the exchanges 2 includes a plurality of trunks 37 provided for the ATM switch module 6 as shown in FIG. 11. Meanwhile, each of the picture phone terminals 1A to 1C is modified such that, as seen from FIG. 12, the image composing section 30 and the image and sound storage section 31 in the image and sound processing section 9 are omitted and also the interrupt control section 32 for controlling an incoming call of request for interruption during communication in the first embodiment is omitted. An interrupt controlling function similar to that of the interrupt control section 32 is performed, in the present embodiment, by the BCPR 18 of the exchange 2 together with the original controlling function.

Each of the trunks 37 provided for the ATM switch module 6 of the exchange 2 in the present embodiment includes an image composing section 38 serving as image composing means and an image and sound storage section 39 serving as image storage means which correspond to the image composing section 30 and the image and sound storage section 31 in the first embodiment, respectively.

The image composing section 38 composes image information from a plurality of picture phone terminals, and for example, composes image information from a picture phone terminal having made a request for interruption with image information from the picture phone terminal with which communication is proceeding. Meanwhile, the image and sound storage section 39 has communication holding standby information and communication rejection information stored in advance as image information or sound information therein.

It is to be noted that, while each of the exchanges 2 in the present embodiment includes a plurality of trunks 37 each including an image composing section 38 and an image and sound storage section 39, where it includes a plurality of such trunks 37 in this manner, it can cope with such a case wherein a plurality of requests for an interrupt service take place in a plurality of communications which are proceeding at present through the exchange 2.

Further, in the present embodiment, the ATM switch module 6 and the multiplexer/demultiplexer 5 in the exchange 2 have a function of transmitting composite image information composed by the image composing section 38 to the picture phone terminals 1A to 1C and another function of transmitting communication holding standby information or/and communication rejection information stored in the image and sound storage section 39. Further, the ATM switch module 6 has a function as switching means for switching the communicating condition among the picture phone terminals 1A to 1C.

With the construction described above, in the second embodiment of the present invention, when communication is performed between the picture phone terminals 1A and 1B as seen from FIG. 11, communication processing Is performed in the following manner in the individual terminals.

In particular, as seen from FIG. 12, the picture phone terminal 1A receives, at the interface section 25, a signal from the picture phone terminal 1B transmitted thereto by way of the broadband ISDN (ATM network) 4. The signal received at the interface section 25 is sent to the ATM cell decomposing and composing section 26, in which the ATM cell is decomposed into several data, which are thus outputted to pertaining processing sections.

Then, call processing is performed to connect the call by the signaling section 29. Consequently, communication with the other party terminal will thereafter be performed. In short, the image processing section 27 and the sound processing section 28 perform processing of signals from the ATM cell decomposing and composing section 26 and output the thus processed signals to the monitor 33 and the loudspeaker/microphone 35 so that an image and sound may be produced from them, respectively.

Meanwhile, image information and sound information from the subscriber of the picture phone terminal 1A are outputted by way of the camera 34 and the loudspeaker/microphone 35 to the image processing section 27 and the sound processing section 28, respectively, in which they are individually processed. The thus processed image information and sound information are outputted to the ATM cell decomposing and composing section 26. The data from the processing sections 27 and 28 are thus composed into an ATM cell and then multiplexed by the ATM cell decomposing and composing section 26, whereafter they are sent to the broadband ISDN (ATM network) 4 by way of the interface section 25 and then received by the picture phone terminal 1B of the addressee. Communicating processing is performed in a similar manner on the picture phone terminal 1B side of the addressee.

Further, when an incoming call arrives, during communication between the two terminals 1A and 1B, at one of the terminals 1A and 1B, for example, at the terminal 1A from a third picture phone terminal 1C, the subscriber during communication to which the incoming call is directed will operate the signaling section 29 by way of manual operation of the control board 36 to effect desired interrupt processing.

In the following, interrupt processing which is performed by the terminal 1A to which the incoming call is directed will be described.

First, when an incoming call arrives, during communication between the two picture phone terminals 1A and 1B, at the picture phone terminal 1A of the two picture phone terminals from a third picture phone terminal 1C, if the user of the picture phone terminal 1A selects the first mode in which the picture phone terminal 1A selects the picture phone terminal 1C in priority over the picture phone terminal 1B with which the communication is proceeding and then a notification representing such selection of the first mode is transmitted to the exchange 2 (in the case of the first embodiment, if the first mode selecting key of the key section 36a of the control board 36 is selectively operated), interrupt processing proceeds in the following manner.

Figure 13:
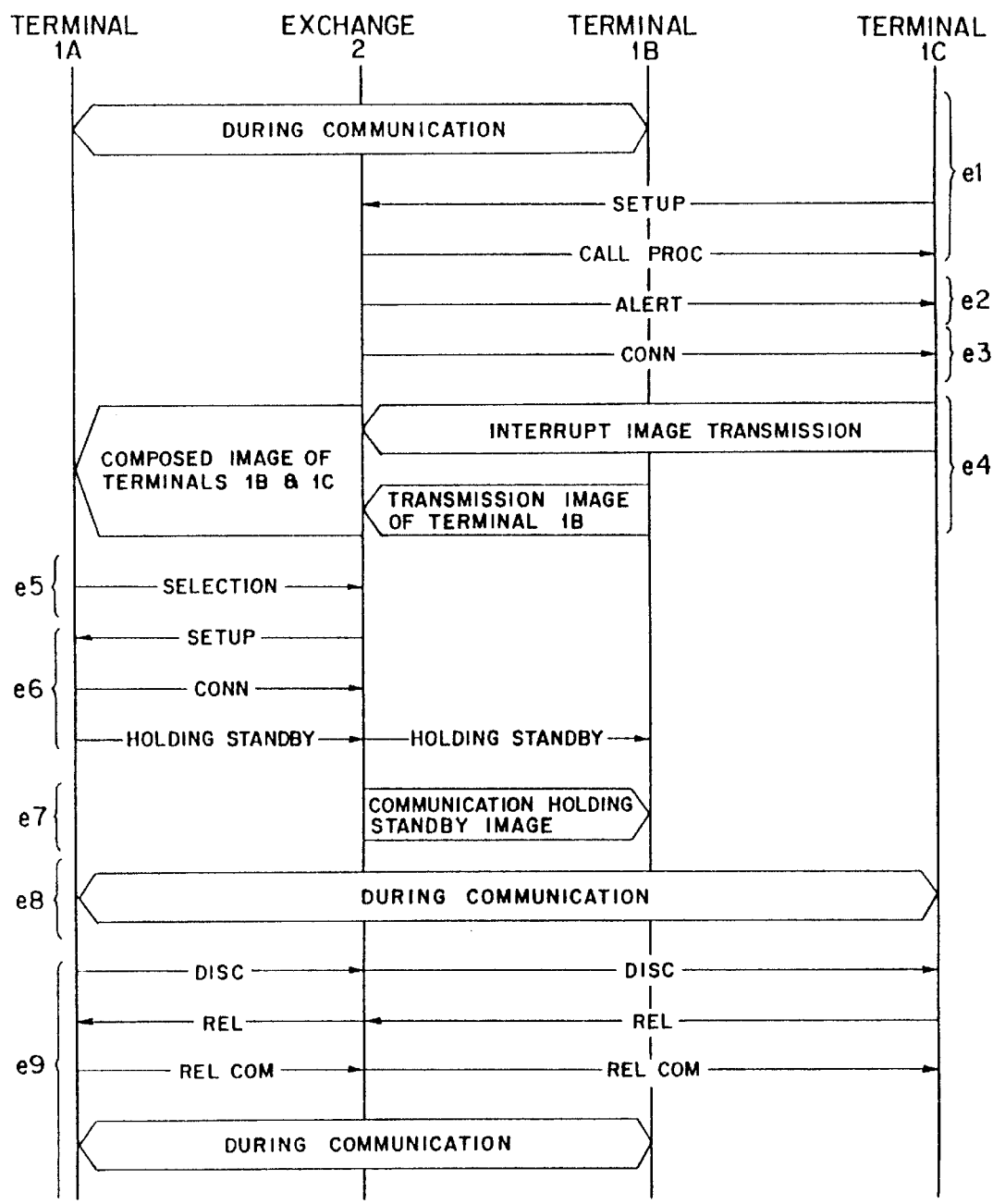
FIG. 13 is a diagram showing a signal sequence illustrating operation of the second embodiment in a first mode.

FIG. 13 shows a signal sequence illustrating operation of the image communication system in the first mode. If the picture phone terminal 1A is communicating with the picture phone terminal 1B when it receives an incoming call (SETUP signal) from the picture phone terminal 1C as seen from e1 in FIG. 13, the exchange 2 delivers a signal information factor of an ALERT signal to the picture phone terminal 1C as seen from e2 of FIG. 13. Thereafter, the exchange 2 connects a call also to the picture phone terminal 1C in response to a CONN signal indicated at e3 in FIG. 13. It is to be noted that the signal information factor of the ALERT signal is constituted, also in the present embodiment, from three octets representative of an information factor identification value, a signal content length and a signal value as illustrated in FIG. 4 of the first embodiment.

In this instance, an image of the picture phone terminal 1B is displayed on the monitor 33 of the picture phone terminal 1A while another image of the picture phone terminal 1A is displayed on the monitor 33 of the picture phone terminal 1B, similarly as in FIG. 6(a) of the first embodiment.

Then, when the ALERT signal and the CONN signal are received as described above, the picture phone terminal 1C sends image information of reception of the incoming call to the exchange 2 side as seen from e4 in FIG. 13. The exchange 2 thus composes, at the image composing section 38 of one of the trunks 37, the image information with image information from the picture phone terminal 1B with which the picture phone terminal 1A is communicating, and the thus composed image is delivered to the picture phone 1A side.

As a result, the picture phone terminal 1A receives the composed image by way of the broadband ISDN (ATM network) 4 and displays the composed image of the picture phone terminal 1B and the picture phone terminal 1C. Consequently, the subscriber of the picture phone terminal 1A will confirm the incoming call from the picture phone terminal 1C.

In this instance, similarly as in FIG. 6(b) of the first embodiment, the image of the picture phone terminal 1B is displayed on the monitor 33 of the picture phone 1A while the image of the picture phone terminal 1C is displayed in a reduced scale at a corner of the thus displayed image on the monitor 33. Meanwhile, the image of the picture phone terminal 1A is displayed on the picture phone terminal 1B.

If the subscriber of the picture phone terminal 1A selects, after examination of the composite image of the picture phone terminals 1B and 1C, acceptance of the incoming call from the picture phone terminal 1C, then the subscriber will send out, as shown at e5 in FIG. 13, from the picture phone terminal 1A to the exchange 2 a notification that the picture phone terminal 1C is selected in priority over the picture phone terminal 1B with which the picture phone terminal 1A is communicating.

Receiving the notification, the exchange 2 switches to establish a communicating condition between the picture phone terminals 1C and 1A as shown at e6 in FIG. 13 and sends out the communication holding standby information stored in the image and sound storage section 39 of the trunk 37 to the picture phone terminal 1B as shown at e7 in FIG. 13 so that the picture phone terminal 1B may thereafter remain in a holding standby condition.

In this instance, similarly as in FIG. 6(c) of the first embodiment, an image of the picture phone terminal 1C is displayed on the monitor 33 of the picture phone terminal 1A while the holding standby image from the image and sound storage section 39 provided in the exchange 2 is displayed on the picture phone terminal 1B. Meanwhile, the image of the picture phone terminal 1A is displayed on the picture phone terminal 1C.

As a result, as shown at e8 in FIG. 13, communication is performed between the picture phone terminals 1A and 1C. Then, when the communication between the picture phone terminals 1A and 1C comes to an end, the communication between the picture phone terminals 1A and 1B is resumed as seen from e9 of FIG. 13.

In this instance, the picture phone terminal 1A restores the condition prior to the arrival of the incoming call from the picture phone terminal 1C similarly as in FIG. 6(d) of the first embodiment. The processing when the picture phone terminal 1C of the incoming call is preferentially selected (when the first mode is selected) is completed thereby.

In this manner, an image composing section 38 and an image and sound storage section 39 are provided in an exchange 2 interposed between different picture phone terminals so that, when an incoming call arrives, during communication between two picture phone terminals 1A and 1B, at one 1A of the picture phone terminals 1A and 1B from a third picture phone terminal 1C, image information of arrival of the incoming call sent from the picture phone terminal 1C to the exchange 2 side is composed, at the image composing section 38, with image information from the picture phone terminal 1B with which the picture phone terminal 1A is communicating at present, and the thus composed image is delivered to the picture phone terminal 1A. Meanwhile, when a notification that the picture phone terminal 1C is selected in priority over the picture phone terminal 1B is delivered from the picture phone terminal 1A to the exchange 2, the exchange 2 switches to establish a communicating condition between the picture phone terminals 1C and 1A while it sends the communication holding standby information stored in the image and sound storage section 39 to the picture phone terminal 1B. Consequently, during communication, the called party of the incoming call can obtain a notification of the calling party in the form of an image. Accordingly, the called party can discriminate from whom the incoming call originates and whether the incoming call is important. As a result, the called party can freely select whether the incoming call should be rejected or accepted.

Then, when the called party selects acceptance of the incoming call, the called party must request the former other party to hold the call and stand by, and in this instance, the communication holding standby image and sound registered in advance can be sent to the former other party. Consequently, the called party can moderate the tedious time the formed other party may otherwise be given from the called party.

Further, since it is possible to install the image composing section 38 and the image and sound storage section 39 on the network side, conventional terminals of conventional construction can be used as the terminals without increasing the load to them. As a result, high contribution can be achieved to wide spread of picture phones without involving an increase in cost or scale.

Subsequently, description will be given of another case wherein, when an incoming call arrives, during communication between the two picture phone terminals 1A and 1B, at the picture phone terminal 1A from a third picture phone terminal 1C, the picture phone terminal 1A selects the picture phone terminal 1B with which the picture phone terminal 1A is communicating in priority over the picture phone terminal 1C, in short, when the second mode is selected and a notification of such selection is transmitted to the exchange 2 (in the first embodiment, when the second mode selecting key of the key section 36a of the control board 36 is selectively operated).

Figure 14:
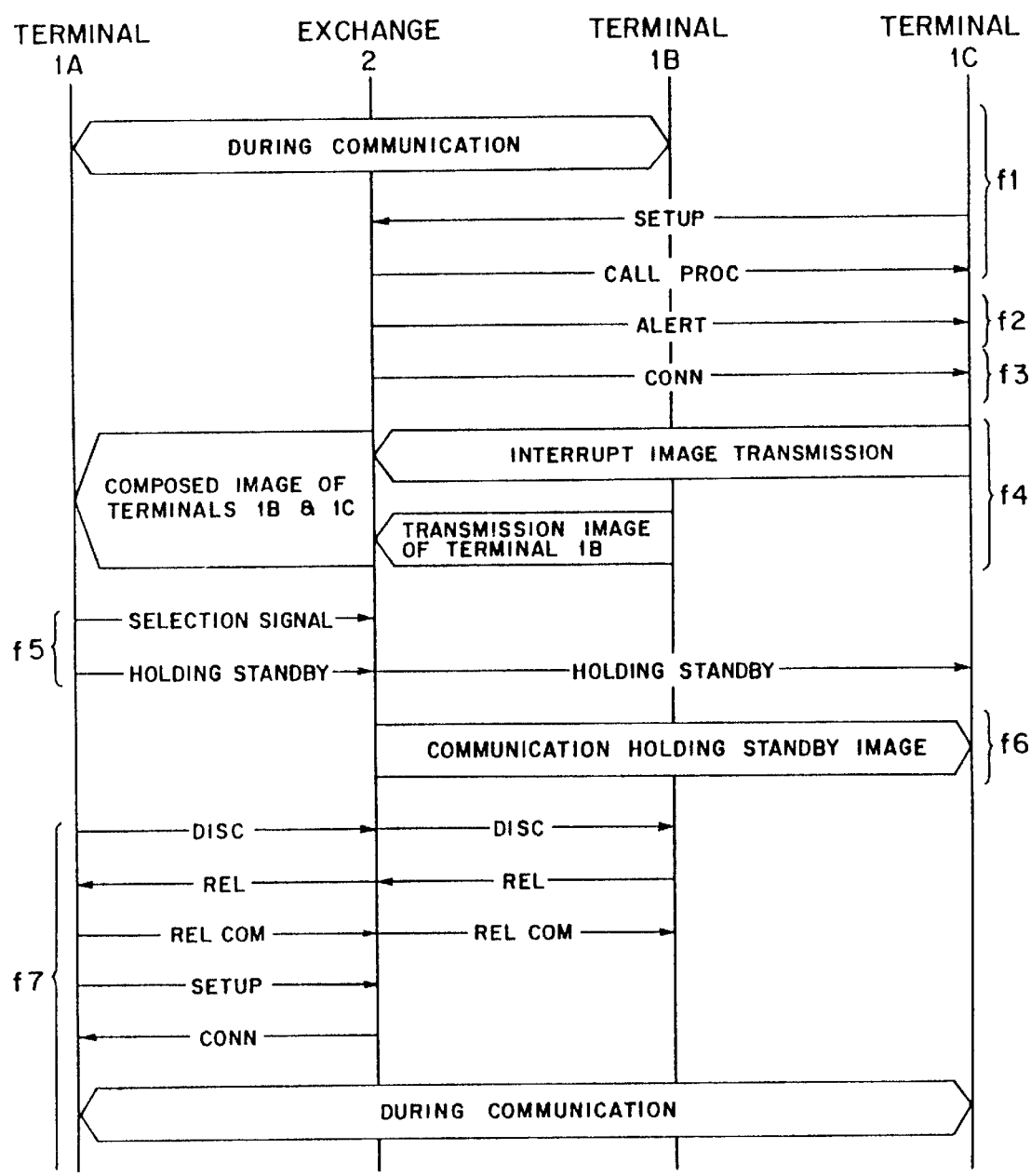
FIG. 14 is a diagram showing a signal sequence illustrating operation of the second embodiment in a second mode.

FIG. 14 shows a signal sequence illustrating operation of the image communication system in the second mode. Operations at f1 to f4 in FIG. 14 (that is, operation after the picture phone terminal 1A receives an incoming call from the picture phone terminal 1C until it receives a composite image of the picture phone terminals 1B and 1C and monitors the composite image) are performed in a similar manner as in the case of e1 to e4 in FIG. 13. In particular, an image of the picture phone terminal 1B is first displayed on the monitor 33 of the picture phone terminal 1A while an image of the picture phone terminal 1A is displayed on the picture phone terminal 1B similarly as in FIG. 8(a) of the first embodiment. Thereafter, similarly as in FIG. 8(b) of the first embodiment, the image of the picture phone terminal 1B is displayed on the monitor 33 of the picture phone terminal 1A while the image of the picture phone terminal 1C is simultaneously displayed in a reduced scale at a corner of the displayed image on the monitor 33. Meanwhile, the image of the picture phone terminal 1A is displayed on the picture phone terminal 1B.

Then, if the subscriber of the picture phone terminal 1A selects, after examination of the composite image of the picture phone terminals 1B and 1C, to cause the picture phone terminal 1C to stand by, the picture phone terminal 1A sends out to the exchange 2 a notification that it selects the picture phone terminal 1B with which it is communicating in priority over the picture phone terminal 1C and another notification that the picture phone 1C should stand by as seen from f5 in FIG. 14.

Receiving the notifications, the exchange 2 maintains the communication between the picture phone terminals 1A and 1B (in short, maintains the present communicating condition) and sends the communication holding standby information stored in the image and sound storage section 39 to the picture phone terminal 1C as seen from f6 in FIG. 14 so as to cause the picture phone terminal 1C to thereafter stand by.

In this instance, similarly as in FIG. 8(c) of the first embodiment, the image of the picture phone 1B is displayed on the monitor 33 of the picture phone terminal 1A while the Image of the picture phone terminal 1A is displayed on the picture phone terminal 1B. Meanwhile, the communication holding standby image from the image and sound storage section 39 provided for the exchange 2 is displayed on the picture phone terminal 1C.

Then, when the communication between the picture phone terminals 1A and 1B comes to an end, the exchange 2 disconnects the call between the picture phone terminals 1A and 1B and then starts communication of the picture phone terminal 1A with the picture phone terminal 1C as seen from f7 in FIG. 14.

In this instance, the image of the picture phone 1C is monitored on the picture phone terminal 1A while the image of the picture phone terminal 1A is monitored on the picture phone terminal 1C as shown in FIG. 6(d). The processing when the picture phone terminal 1B during communication is selected preferentially (when the second mode is selected) proceeds in such a manner as described above.

In this manner, when the formerly composed image is transmitted to the picture phone terminal 1A while the notification that the picture phone terminal 1B is selected in priority over the picture phone terminal 1C is delivered from the picture phone terminal 1A to the exchange 2, the exchange 2 maintains the current communicating condition and sends the communication holding standby information stored in the image and sound storage section 39 to the picture phone terminal 1C. Consequently, in addition to the effects in the mode described hereinabove with reference to FIG. 13, the current communicating condition can be continued as it is so that the conversation is not interrupted. Meanwhile, the picture phone terminal 1C having sending out the incoming call can be put into a holding standby condition, and during such holding standby condition, the communication holding standby image and sound registered in advance can be transmitted to the picture phone terminal 1C so that the tedious feeling of the subscriber of the picture phone terminal 1C can be moderated.

Subsequently, description will be given of a further case wherein, when an Incoming call arrives, during communication between the two picture phone terminals 1A and 1B, at the picture phone terminal 1A from a third picture phone terminal 1C, the picture phone terminal 1A wants to reject the communication with the picture phone terminal 1C, in short, when the third mode is selected and a notification of such selection is transmitted to the exchange 2 (in the first embodiment, when the third mode selecting key of the key section 36a of the control board 36 is selectively operated).

Figure 15:
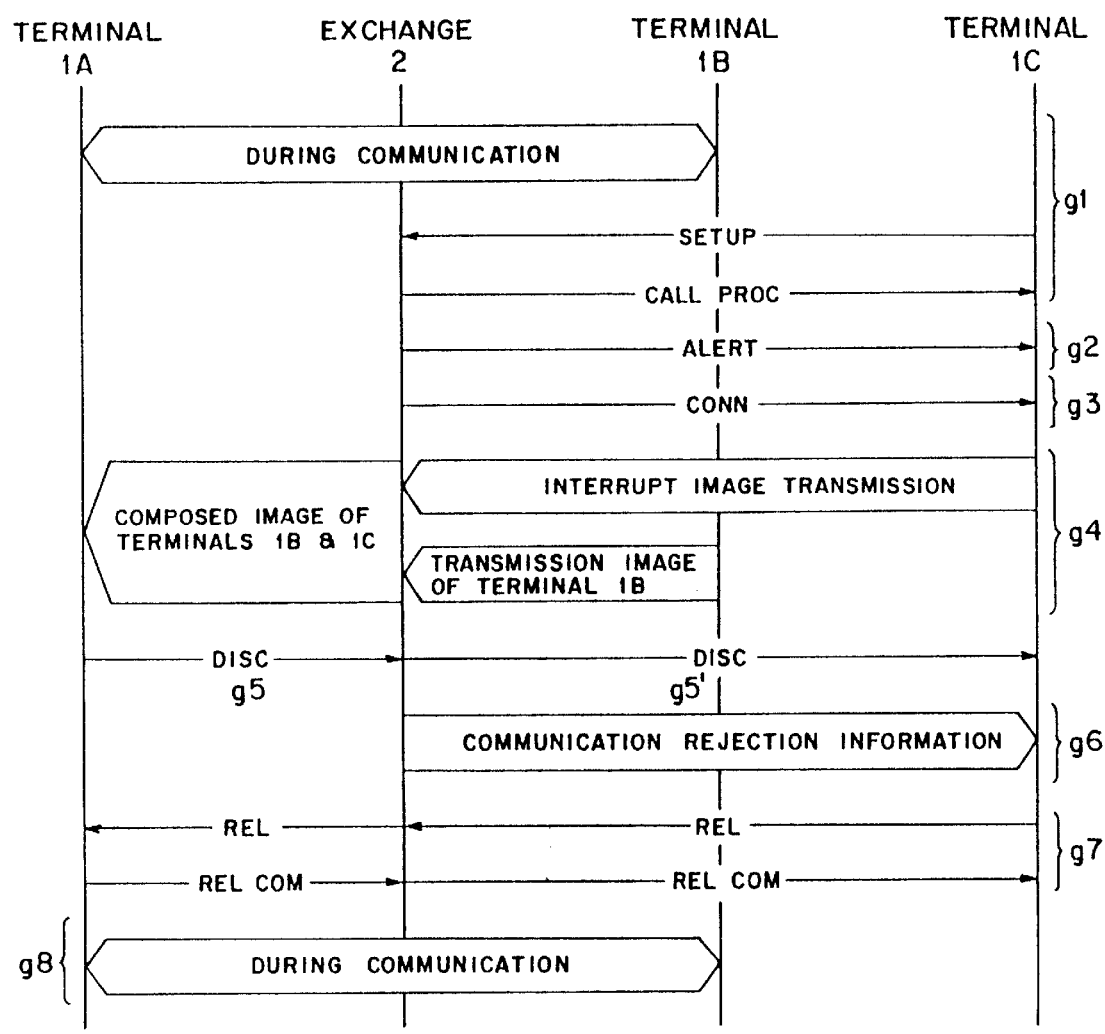
FIG. 15 is a diagram showing a signal sequence illustrating operation of the second embodiment in a third mode.

FIG. 15 shows a signal sequence illustrating operation of the image communication system in the third mode. Operations at g1 to g4 in FIG. 15 (that is, operation after the picture phone terminal 1A receives an incoming call from the picture phone terminal 1C until it receives a composite image of the picture phone terminals 1B and 1C and monitors the composite image) are performed in a similar manner as in the cases of FIGS. 13 and 14 described above. In particular, an image of the picture phone terminal 1B is first displayed on the monitor 33 of the picture phone terminal 1A while an image of the picture phone terminal 1A is displayed on the picture phone terminal 1B similarly as in FIG. 10(a) of the first embodiment. Thereafter, similarly as in FIG. 10(b) of the first embodiment, the image of the picture phone terminal 1B is displayed on the monitor 33 of the picture phone terminal 1A while the image of the picture phone terminal 1C is simultaneously displayed in a reduced scale at a corner of the displayed image on the monitor 33. Meanwhile, the image of the picture phone terminal 1A is displayed on the picture phone terminal 1B.

Then, if the subscriber of the picture phone terminal 1A selects, after examination of the composite image of the picture phone terminals 1B and 1C, rejection of the communication with the picture phone terminal 1C, the picture phone terminal 1A sends out to the exchange 2 a notification (DISC signal) representing that it wants to reject the communication with the picture phone terminal 1C as seen from g5 in FIG. 15.

Receiving the notification, the exchange 2 transmits a similar notification (DISC signal) to the picture phone terminal 1C as seen from g5' in FIG. 15 and then sends the communication rejection information stored in the image and sound storage section 39 to the picture phone terminal 1C as seen from g6 in FIG. 15 to reject the communication with the picture phone terminal 1C. Thereafter, the exchange 2 performs call disconnecting processing shown at g7 in FIG. 15 while it maintains the communicating condition at present to continue the communication between the picture phone terminals 1A and 1B as seen from g8 in FIG. 15.

Figure 10C:
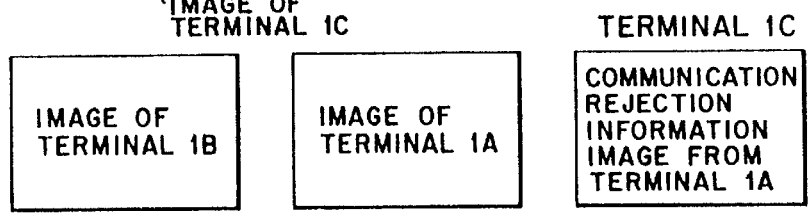

In this instance, similarly as in FIG. 10(c) of the first embodiment, the image of the picture phone 1B is displayed on the monitor 33 of the picture phone terminal 1A while the image of the picture phone terminal 1A is displayed on the picture phone terminal 1B. Meanwhile, the image based on the communication rejection information received from the exchange 2 is displayed on the picture phone terminal 1C. The processing when the incoming call is rejected during communication (when the third mode is selected) proceeds in such a manner as described above.

In this manner, when the formerly composed image is transmitted to the picture phone terminal 1A while the notification that the communication with the picture phone terminal 1C should be rejected is delivered from the picture phone terminal 1A to the exchange 2, the exchange 2 maintains the communicating condition at present and sends the communication rejection information stored in the image storage section 4 to the picture phone terminal 1C. Consequently, in addition to the effects described hereinabove, when rejection is selected, the current communicating condition can be continued without disturbing the other party of the communication and important conversation is not interrupted. Meanwhile, since the calling subscriber to be rejected (picture phone terminal 1C) is notified of the will of rejection by way of an image or sound, the calling subscriber can clearly know that the called subscriber is present but is in a communicating condition.

C. Third Embodiment

Figure 16:
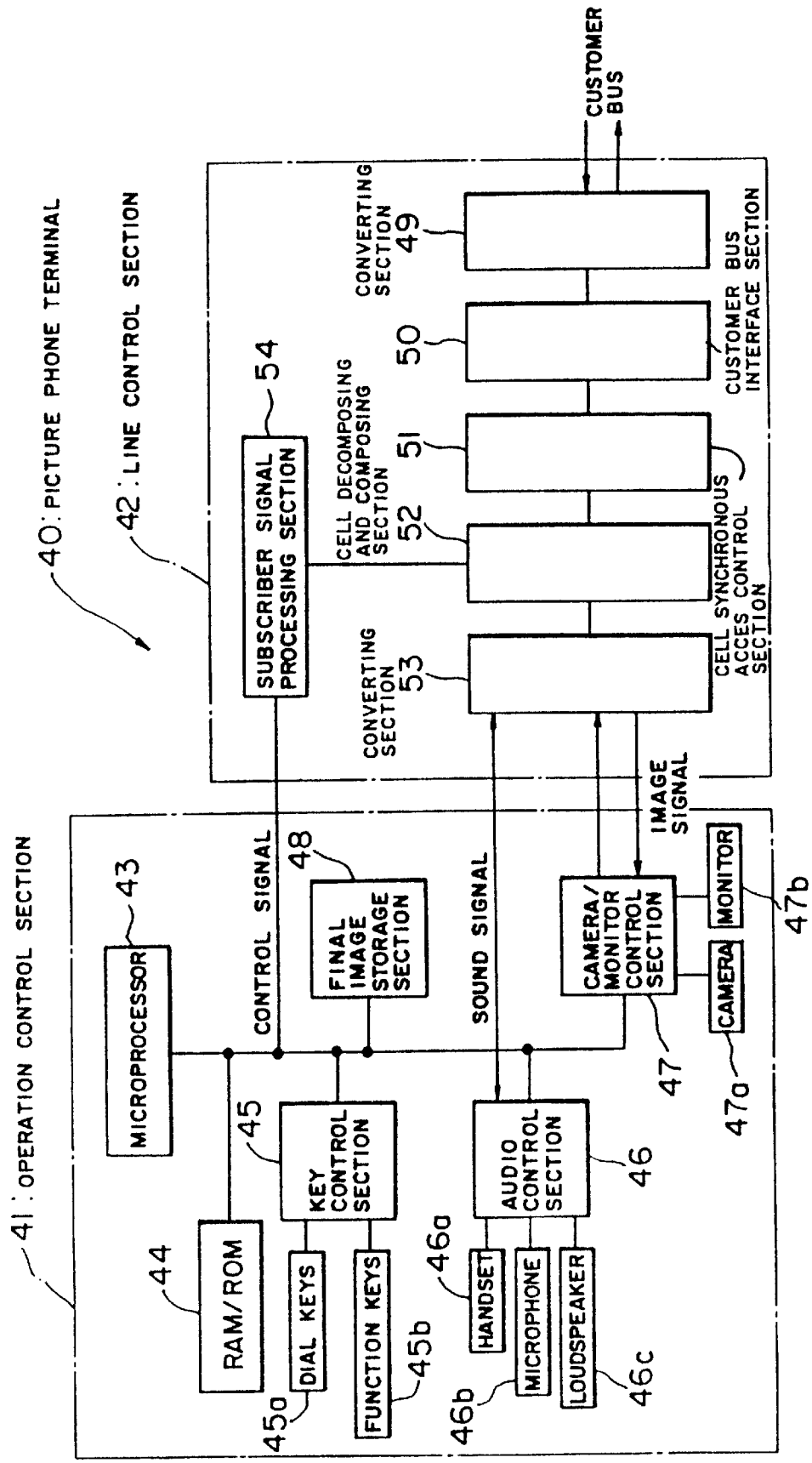
FIG. 16 is a block diagram showing detailed construction of a picture phone terminal employed in a third preferred embodiment of the present invention.

FIG. 16 shows detailed construction a picture phone terminal which is employed in a third preferred embodiment of the present invention. In particular, the picture phone terminal 40 shown in FIG. 16 is employed for the picture phone terminals 1A to 1C described hereinabove in the first and second embodiments of the present invention. In FIG. 16, the picture phone terminal 40 is shown somewhat different in construction from the picture phone terminals 1A to 1C in the first and second embodiments (refer to FIGS. 2 and 12), but it has the same basic functions as those of the picture phone terminals 1A to 1C of the first and second embodiments.

Referring to FIG. 16, the picture phone terminal 40 in the present embodiment roughly includes two components, that is, an operation control section 41 and a line control section 42.

The main functions of the operation control section 41 include detection of a key input, management of a communicating condition and notification of the communicating condition to the line control section 42, control of a camera and a monitor, and processing of a sound signal and an image signal. The operation control section 41 includes a microprocessor 43, a RAM/ROM (random access memory/ read-only memory) 44, a key control section 45, an audio control section 46, a camera/monitor control section 47 and a final image storage section 48.

Here, the microprocessor 43 and the RAM/ROM 44 collectively control operation of the picture phone terminal 40. The key control section 45 functions similarly to the control board 36 in the first and second embodiments and detects a key input from a dial key 45a or a function key 45b. The audio control section 46 performs processing of an input sound signal from a handset 46a or a microphone 46b and processing of an output sound signal to the handset 46a or a loudspeaker 46c, and controls operation of the handset 46a, the microphone 46b and the loudspeaker 46c. The camera/monitor control section 47 performs processing of an input image signal from a camera 47a and processing of an output image signal to a monitor 47b, and controls operation of the camera 47a and the monitor 47b. The final image storage section 48 performs a characteristic function of the present embodiment and will be hereinafter described in detail.

Meanwhile, the main functions of the line control section 42 are similar to those of the signal processing section 11 in the first and second embodiments and include interface with a customer bus, decomposing and composing of an ATM cell and processing of a subscriber signal. The line control section 42 includes a converting section 49 having a photoelectric (O/E) converting function and an electro-optic (E/O) converting function, a customer bus interface section 50, a cell synchronous access control section 51, a cell decomposing and composing section 52, another converting section 53 having an analog to digital (A/D) converting function and a digital to analog (D/A) converting function, and a subscriber signal processing section 54. It is to be noted that all of the components of the picture phone terminal 40 described above are provided in conventional picture phone terminals except for the final image storage section 48.

By the way, the characteristic function of the picture phone terminal 40 in the present embodiment is to provide a notification of disconnection of communication from the picture phone terminal 1B or 1C which has been put into a communication holding standby condition as a result of selective designation from the control board 36 of the picture phone terminal 1A in the first or second embodiment (that is, a notification of disconnection of communication to the picture phone terminal 1A from the picture phone terminal 1B or 1C which has received a communication holding standby image at b3 in FIG. 5, c3 in FIG. 7, e7 in FIG. 13 or f7 in FIG. 14 and entered a communication holding standby condition). It is to be noted that, in the following description, a picture phone terminal which has sent out a communication holding standby image may be called holding calling party while another picture phone terminal which has received the communication holding standby image and entered a communication holding condition may be called holding called party.

Operation of a picture phone terminal which has received a communication holding standby image and entered a communication holding standby condition is entirely committed, in the holding condition, to the will of the holding calling subscriber except that it itself disconnects the communication. Accordingly, the holding called party can operate nothing but either to just wait watching the communication holding standby image until the communication holding standby condition is cancelled by the holding calling party side or to disconnect the communication arbitrarily.

Thus, in the present embodiment, as shown in FIG. 16, the picture phone terminal 40 additionally includes, as one of the function keys 45b, a key for allowing the holding called party side to make an action without changing the holding condition, such as, for example, a final image transmitting button. Thus, in response to manual operation of the specific key, communication disconnection notifying information including a message representing that, when the holding called party wants in a holding standby condition to disconnect the communication with the holding calling party, it disconnects the communication, is produced as image information and transmitted to the holding calling party side.

It is to be noted that such transmission service of a communication disconnection notification can be realized by using the INFO message prescribed by the CCITT/Q931 document. Further, as such communication disconnection notifying information, communication disconnection notifying information which is recalled from the RAM/ROM 44 in which it is stored as image information in advance may be used or final image information photographed and produced by the camera 47a may be used.

Further, as described hereinabove, the operation control section 41 of the picture phone terminal 40 in the present embodiment includes the final image storage section 48. The final image storage section 48 temporarily stores therein communication disconnection notifying information from a holding called party as a final image. The final image stored in the final image storage section 48 is read out after the holding calling party ends the communication with the picture phone terminal with which it is communicating at present, and is displayed on the monitor 47b under the control of the camera/monitor control section 47.

Figure 17:
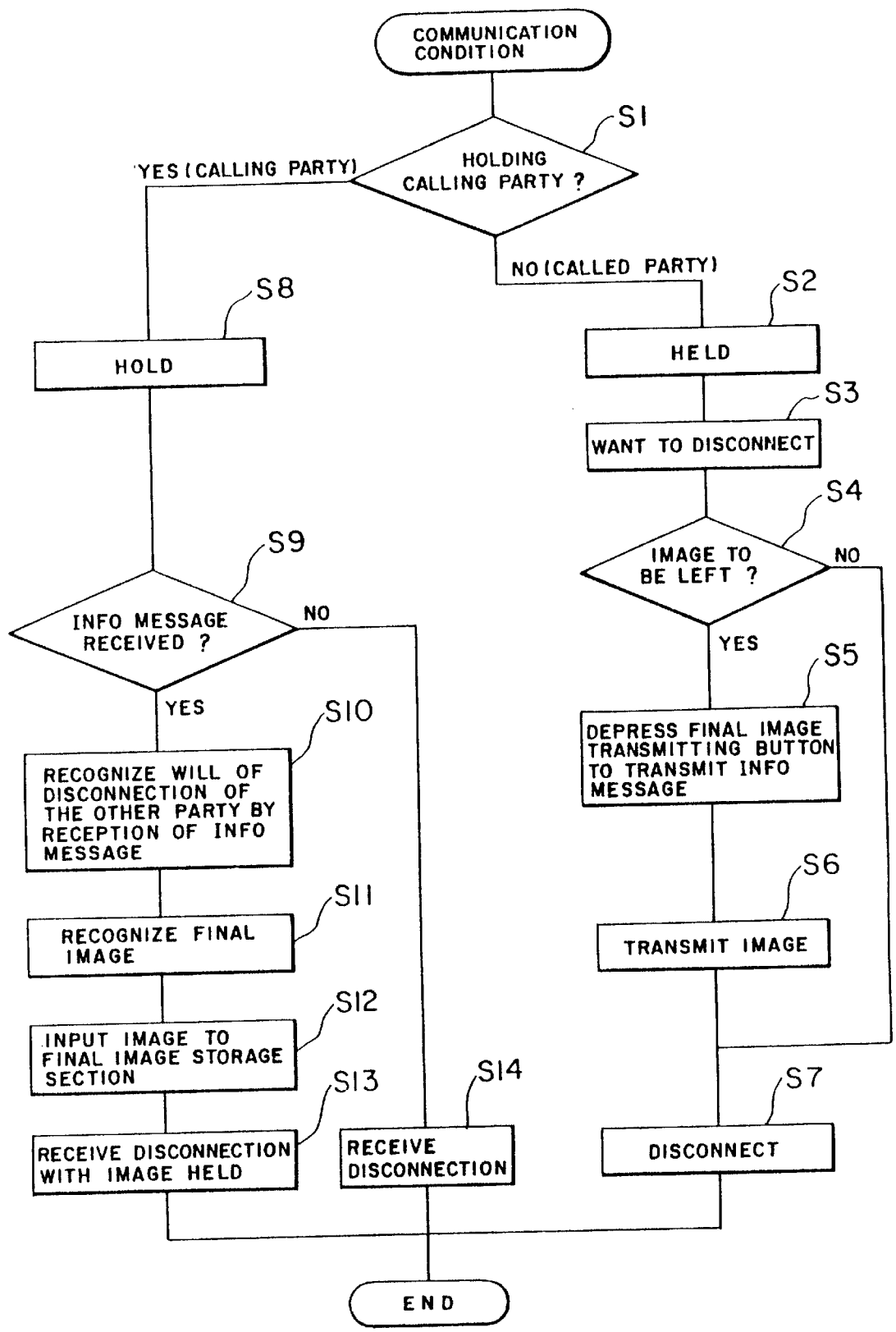
FIG. 17 is a flow chart illustrating operation of the third embodiment.

A communication disconnecting operation of the picture phone terminal 40 of the construction described above which is performed by a holding called party in a communication holding waiting condition will be described subsequently with reference to FIG. 17. In particular, when two such picture phone terminals 40 are in a communicating condition, each of the picture phone terminals 40 judges whether or not the terminal 40 itself is a holding calling party (step S1), and when the terminal 40 is not the holding calling party, that is, when the terminal 40 is the holding called party, it receives communication holding standby information and is put into a holding condition (step S2).

When the holding called party in such communication holding standby condition wants to disconnect the communication (step S3), it determines whether or not a final image (communication disconnection notifying information) should be transmitted to the holding calling party and left. In short, when the final image should not be left, communication disconnecting processing is performed immediately (step S7). On the contrary, when the holding called party wants to transmit the final image to the holding calling party and leave it, the final image transmitting button among the function keys 45b will manually be depressed. Consequently, the INFO message, which is a message of the subscriber's line signal system, is transmitted to the picture phone terminal 40 on the holding calling party side (step S5). Then, an image of the holding called party is transmitted (step S6), and then, communication disconnecting processing is performed (step S7).

On the other hand, when the terminal 40 judges at step S1 that it is the holding calling party, it transmits the communication holding standby information to the holding called party to put it into a holding condition (step S8). Then, the picture phone terminal 40 on the holding calling party side judges whether or not it has received the INFO message from the holding called party during communication with a third picture phone terminal (step S9). When the picture phone terminal 40 on the holding calling party side has not received the INFO message, either the holding called party performs communication disconnecting processing so that the picture phone terminal 40 on the holding calling party side receives disconnection without leaving a final image (step S14) or, when disconnection is not received, the picture phone terminal 40 on the holding calling party side maintains its communication holding standby condition with the holding called party.

If it is judged at step S9 that the INFO message has been received from the holding called party, the picture phone terminal 40 on the holding calling party side recognizes the will of disconnection of the holding called party based on reception of the INFO message (step S10) and then recognizes a final image from the holding called party (step S11), whereafter it inputs and stores the final image into the final image storage section 48 (step S12). Thereafter, it receives disconnection based on communication disconnecting processing of the holding called party while keeping the final image (step S13).

Then, the final image stored in the final image storage section 48 is read out after the holding calling party ends the communication with the picture phone terminal with which it is communicating at present, and is displayed on the monitor 47b under the control of the camera/monitor control section 47. Observing the display, the holding calling party can recognize that the holding called party has performed communication disconnecting processing.

In this manner, in the third embodiment of the present invention, when the holding called party wants, in a communication holding standby condition, to disconnect its communication by some reason, a final image can be transmitted to and left on the holding calling party side by transmitting communication disconnection notifying information, and accordingly, the holding called party can transmit to the holding calling party the will thereof that it has intentionally disconnected the communication. Accordingly, the third embodiment is advantageous in that the loss of time and the charge required for image communication during holding can be saved.

It is to be noted that, while, in the present third embodiment described above, communication disconnection notifying information from the holding called party is stored once into the final image storage section 48 of the picture phone terminal 40 on the holding calling party side, for example, the communication disconnection notifying information (final image) from the holding called party may alternatively be composed with image information from a picture phone terminal, with which the picture phone terminal of the holding calling side is communicating at present, by the image composing section 30 or 38 (refer to FIG. 2 or 11) in the first or second embodiment so that the thus composed image is displayed on the monitor 47b of the picture phone terminal 40 on the holding calling party side under the control of the camera/monitor control section 47. Also in this instance, similar effects to those of the first and second embodiments described above can be obtained.

Further, when disconnection of communication is to be performed from the holding called party side in the third embodiment described above, if the holding called party wants to re-establish connection with the holding calling party after disconnection of the communication, a message representing that the holding called party wants re-connection may be sent to the holding calling party side together with communication disconnection notifying information (final image). In this instance, after the holding calling party ends the communication with the picture phone terminal with which it is communication at present, the re-connection requesting message is displayed on the monitor 33 of the picture phone terminal 40 together with the final image. Then, the holding calling party will confirm the re-connection requesting message and make a call to the holding called party.

D. Fourth Embodiment

Figure 18:
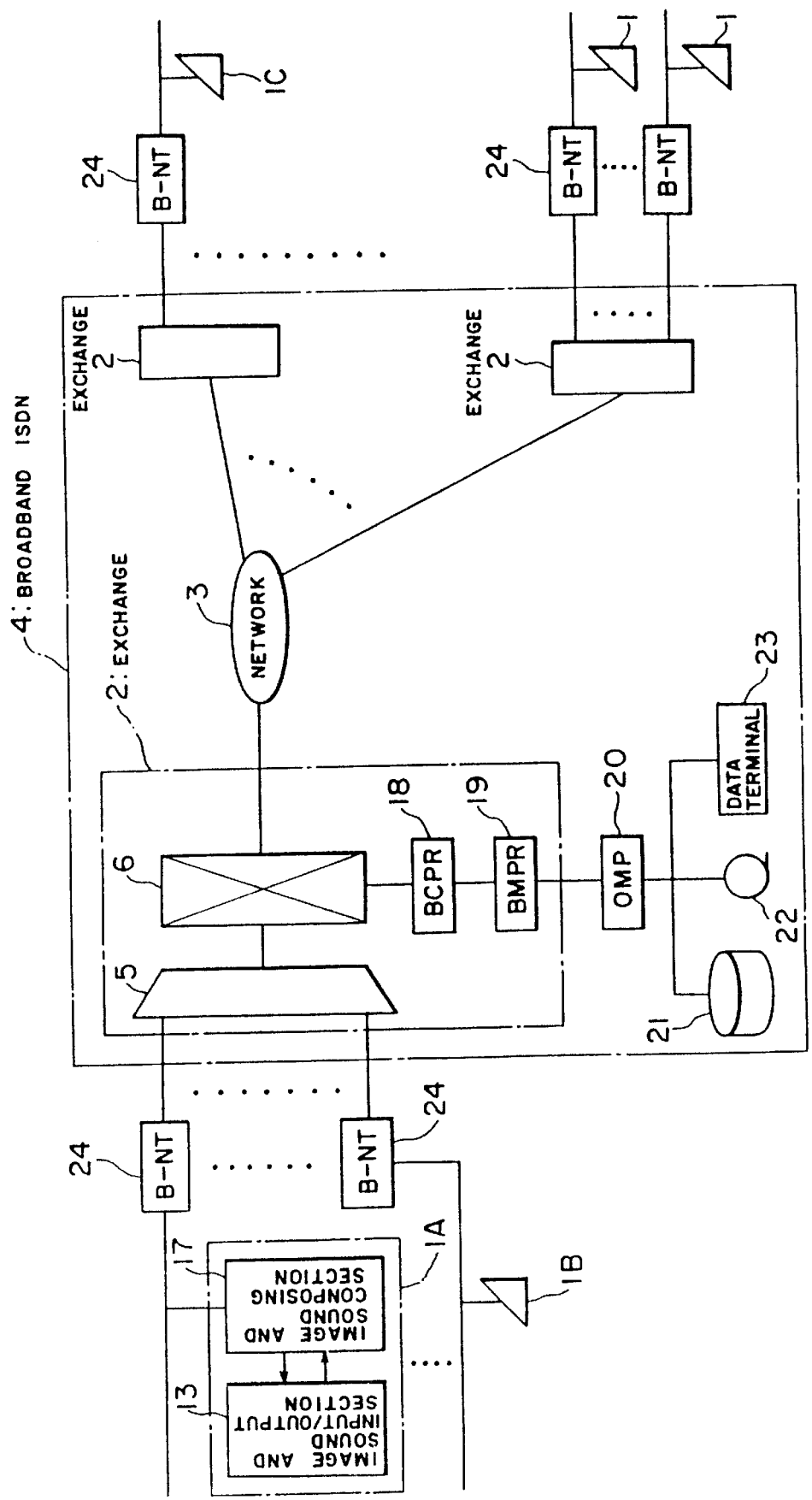
FIG. 18 is a block diagram showing a fourth preferred embodiment of the present invention.
Figure 19:
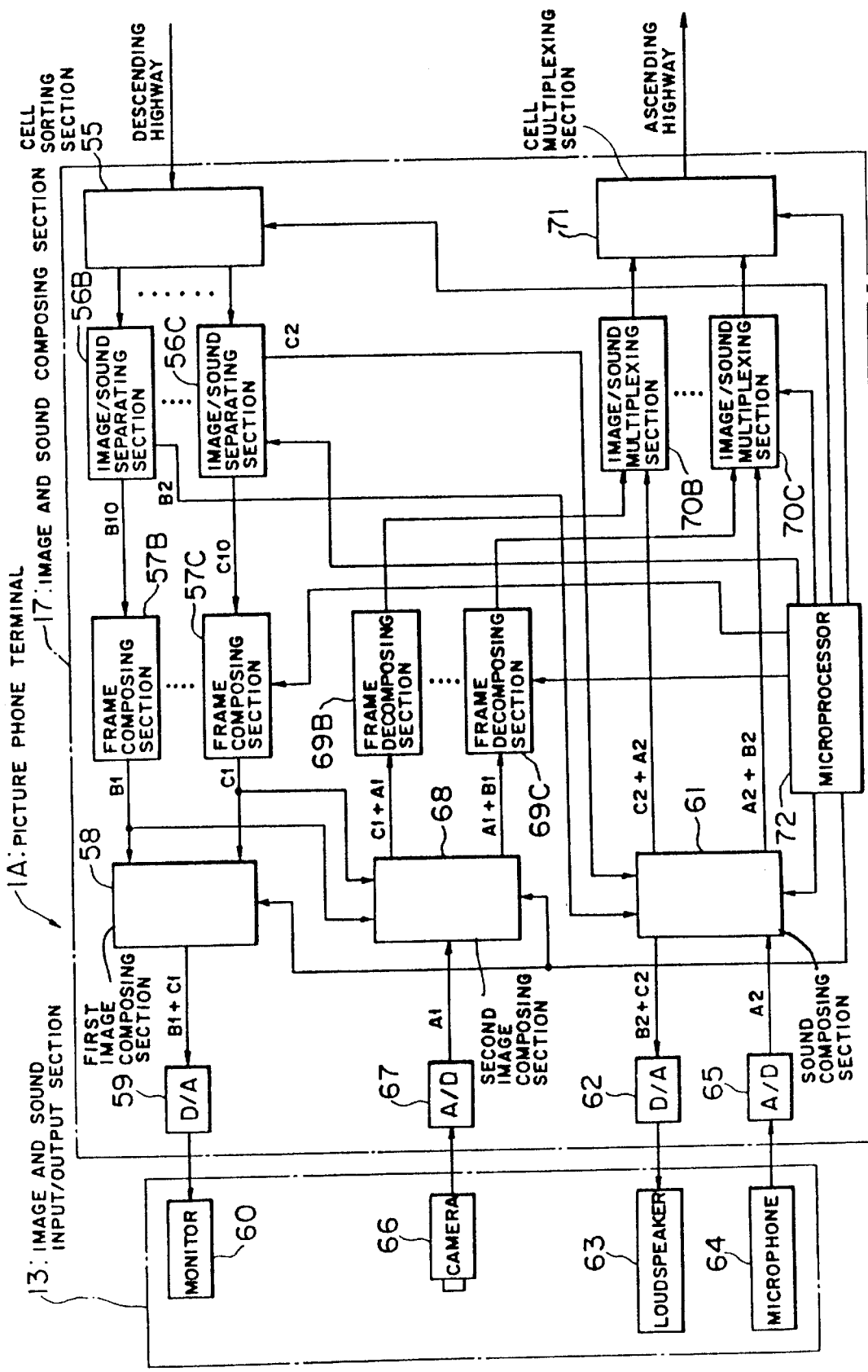
FIG. 19 is a block diagram showing detailed construction of a picture phone terminal employed in the fourth embodiment.

FIG. 18 shows a fourth preferred embodiment of the present invention, and FIG. 19 shows detailed construction of a picture phone terminal employed in the embodiment of FIG. 18. An image communication system in the present embodiment includes several common components to those of the image communication systems of the first and second embodiments described hereinabove with reference to FIGS. 2 and 11. Overlapping description of such common components is omitted herein to avoid redundancy.

Referring first to FIG. 18, the image communication system in the present embodiment has somewhat similar construction to that of the first embodiment shown in FIG. 1, but is modified such that communication among a plurality of picture phone terminals 1 and 1A to 1C can be connected simultaneously by way of the broadband ISDN (ATM network) 4 and a plurality of VCIs (virtual channel identifiers) can be set on lines by way of ATM cells so that a plurality of calls can be extended to allow multi-party communication.

Figure 20:
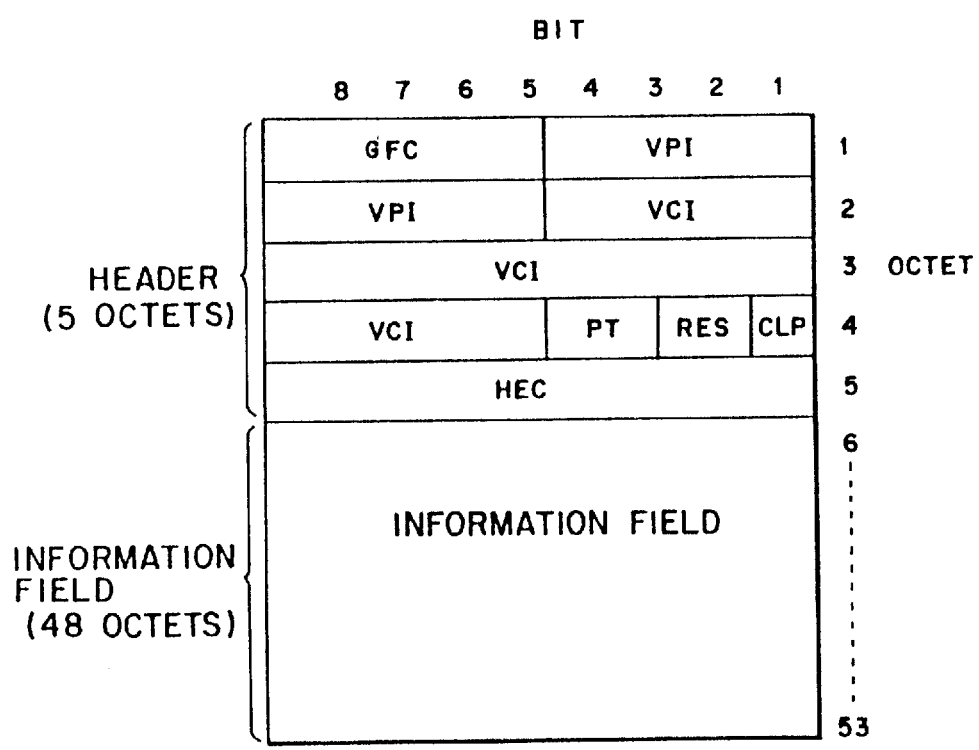
FIG. 20 is a diagrammatic view showing a format of an ATM cell.

Here, the ATM cell has such a format as shown, for example, in FIG. 20. Referring to FIG. 20, the ATM cell shown includes a header portion of 5 octets and an information field portion of 48 octets. The header portion includes fields for GFC (Generic Flow Control), VPI (Virtual Path Identifier), VCI (Virtual Channel Identifier), PT (Payload Type), RES (Reversed Field), CLP (Cell Loss Priority) and HEC (Header Error Control).

Further, in the fourth embodiment, an image and sound composing section 17 serving as image and sound composing means is provided in at least one 1A of the picture phone terminals. The image and sound composing section 17 composes image information and sound information from at least two picture phone terminals (1A to 1C in the present embodiment) in a suitable combination and outputs the thus composed image and sound to the picture phone terminals 1A to 1C. Detailed construction of the image and sound composing section 17 will be hereinafter described with reference to FIG. 19.

It is to be noted that the picture phone terminals 1A to 1C are constructed so that each of them can, during communication with another terminal, deliver an outgoing call to or receive an incoming call from a new third party using a control channel (D channel) for an ATM cell. Each of the picture phone terminals 1A to 1C has, in addition to a function of accepting, when an an incoming call arrives, during communication, from a third picture phone terminal, the interrupting incoming call from the third picture phone terminal and another function of delivering, during communication, an outgoing call to a third picture phone terminal, a further function of receiving image information and sound information from the second and/or third picture phones and a still further function of transmitting composite information composed by the image and sound composing section 17 to the second and/or third picture phones.

The picture phone terminal 1A in the fourth embodiment is constructed in such a manner as shown in FIG. 19. Referring to FIG. 19, the image and sound composing section 17 of the picture phone terminal 1A shown includes a cell sorting section 55 connected to a descending highway from the broadband ISDN 4 for sorting ATM cells from a plurality of terminals (picture phone terminals 1B and 1C in the present embodiment) for the individual terminals each based on information of the header portion. The cell sorting section 55 has, on the output side thereof, a number of output ports equal to the number of terminals with which the picture phone terminal 1A may communicate at a time.

The image and sound composing section 17 further includes a plurality of image/sound separating sections 56B. 56C, ... for receiving cells sorted thereto for the individual terminals by the cell sorting section 55 and separating image information and sound information from the received cells. Particularly, the image/sound separating sections 56B and 56C in the present embodiment each separates image information B10 or C10 and sound information B2 or C2 from information of a cell received from the picture phone terminal 1B or 1C.

The image and sound composing section 17 further includes a plurality of frame composing sections 57B, 57C, ... for composing original frames (images) B1, C1, ... transmitted thereto from the picture phone terminals 1B, 1C, ... based on image information B10, C10, ... from the image and sound separating sections 56B, 56C, ..., respectively, a first image composing section 58 for composing the images B1, C1, ... from the frame composing sections 57B, 57C, ... (that is, images from all of the terminals received at the picture phone terminal 1A) and outputting the thus composed image B1+C1 therefrom, and a digital to analog converting section 59 for converting the composed image B1+C1 from the first image composing section 58 into an analog signal. A monitor (displaying and/or outputting means) 60 of the image and sound input/output section 13 is connected to the digital to analog converting section 59 and displays the composed image B1+C1 received by way of the digital to analog converter 59.

The image and sound composing section 17 further includes a sound composing section 61 which composes sound information B2, C2, ... from the image/sound separating sections 56B, 56C, ... (that is, sound from all of the terminals received at the picture phone terminal 1A) and outputs the composed sound information as composite sound information B2+C2. The composite sound information B2+C2 is converted into an analog signal by a digital to analog converter 62 and then outputted as sound from a loudspeaker (displaying and/or outputting means) 63, which is another component of the image and sound input/output section 13. The sound composing section 61 has another function of composing sound information A2 from the picture phone terminal 1A received from a microphone (inputting means) 64, which is a further component of the image and sound input/output section 13, by way of an analog to digital converting section 65 and sound information B2, C2, ... from the respective image/sound separating sections 56B, 56C, ... into composite sound information C2+A2 and A2+B2 to be transmitted to the picture phone terminals 1B, 1C, ...

The image and sound input/output section 13 further includes a camera 66 serving as inputting means for inputting image information from the picture phone terminal 1A. Meanwhile, the image and sound composing section 17 further includes an analog to digital (A/D) converting section 67 for converting image information from the camera 66 into a digital signal and outputting it as an image A1, and a second image composing section 68 which composes the image A1 from the picture phone terminal 1A received from the camera 66 by way of the digital to analog converting section 67 and images B1, C1, ... from the respective frame composing sections 57B, 57C, ... into composite images C1+A1 and A1+B1 to be transmitted to the picture phone terminals 1B, 1C, ...

The image and sound composing section 17 further includes a plurality of frame decomposing sections 69B, 69C, ... for receiving composite images C1+A1, A1+B1, ... respectively, from the second image composing section 68 and decomposing frames of the composite signals into cells, a plurality of image and sound multiplexing sections 70B, 70C, ... for multiplexing image information from the frame decomposing sections 69B, 69C, ... and composite sound information from the sound composing section 61 to obtain cells to be transmitted to the respective terminals (picture phone terminals 1B and 1C in the present embodiment), and a cell multiplexing section 71 for multiplexing the cells from the image and sound multiplexing sections 70B, 70C, ... and outputting the thus multiplexed cells into an ascending highway to the broadband ISDN 4.

The image and sound composing section 17 further includes a microprocessor 72 for controlling operation and operation timings of the components of the image and sound composing section 17 of the picture phone terminal 1A.

Operation of the image communication system of the present embodiment constructed as described above when the picture phone terminal 1A receives, during communication with the picture phone terminal 1B, an incoming call from the third picture phone terminal 1C and accepts the interrupting incoming call from the picture phone terminal 1C will be described subsequently with reference to FIGS. 19 and 21. When the picture phone terminal 1A receives, during communication with the picture phone terminal 1B as shown at hi in FIG. 21, an incoming call (SETUP signal) from the third picture phone terminal 1C, the broadband ISDN 4 (exchange 2) transmits the SETUP signal to the picture phone terminal 1A as shown at h2 in FIG.21 and then transmits a CALL PROC signal to the picture phone terminal 1C as shown at h3 in FIG. 21.

Figure 21:
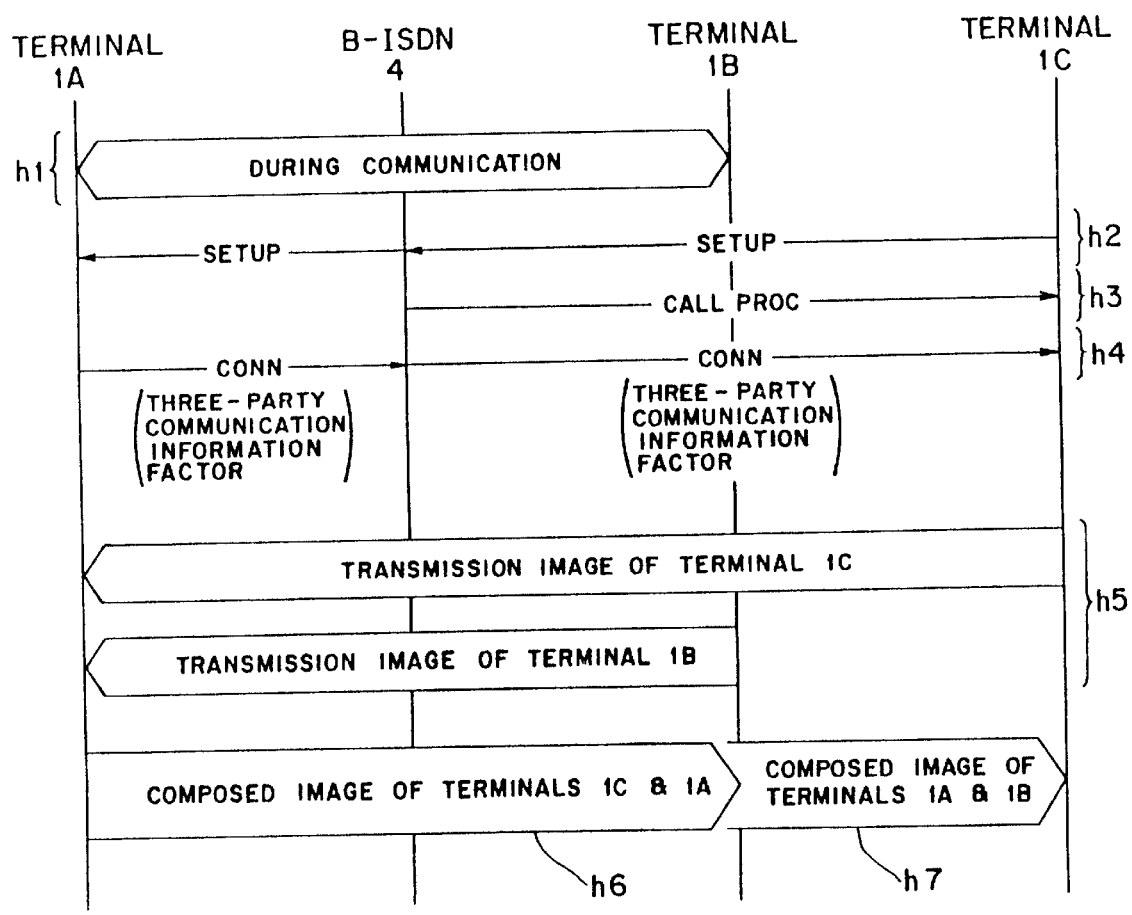
FIG. 21 is a diagram showing a signal sequence illustrating operation of the fourth embodiment.

Then, in response to a reply from the picture phone terminal 1A having received the SETUP signal, a CONN signal having a three-party communication information factor is transmitted to the picture phone terminal 1C by way of the broadband ISDN 4 as shown at h4 in FIG. 21. Upon transmission of the CONN signal, a new VCI for transmitting composite image information and sound information composed from image information and sound information from the picture phone terminal 1A and image information and sound information from the picture phone terminal 1B to the picture phone terminal 1C is set.

Thereafter, the image information and the sound information from the picture phone terminal 1C and the image information and the sound information from the picture phone terminal 1B are transmitted to the picture phone terminal 1A as seen from h5 in FIG. 21. The image and sound composing section 17 of the picture phone terminal 1A thus composes the image information and the sound information from the picture phone terminal 1B and the image information and the sound information from the picture phone terminal 1C, and the thus composed information is outputted from the monitor 60 and the loudspeaker 63 of the picture phone terminal 1A. Further, the image and sound composing section 17 of the picture phone terminal 1A composes image information and sound information from the picture phone terminals 1B and 1C and the picture phone terminal 1A itself, that is, image information and sound information from the picture phone terminals 1A and 1C and the picture phone terminals 1A and 1B, and transmits the composite information C+A and A+B to the picture phone terminals 1B and 1C, respectively, by way of the broadband ISDN 4 as seen from h6 and h7 in FIG. 21. Consequently, a three-party communication condition by the three picture phone terminals 1A to 1C is established, and a composite image of images of the other two picture phone terminals is displayed on the monitor of each of the picture phone terminals 1A to 1C as seen, for example, from FIG. 23(a). Here, the reference characters A to C in FIG. 23(a) denote image information from the picture phone terminals 1A to 1C, respectively.

Another operation of the image communication system of the present embodiment when the picture phone terminal 1A delivers, during communication with the picture phone terminal 1B, an outgoing call to the picture phone terminal 1C and the picture phone terminal 1C accepts the incoming call from the picture phone terminal 1A will be described subsequently with reference to FIGS. 19 and 22. When the picture phone terminal 1A delivers, during communication with the picture phone terminal 1B as seen from i1 in FIG. 22, an outgoing call to a third picture phone terminal 1C, the picture phone terminal 1A transmits a SETUP signal having a three-party communication information factor to the broadband ISDN 4 (exchange 2) as seen from i2 in FIG. 22.

Figure 22:
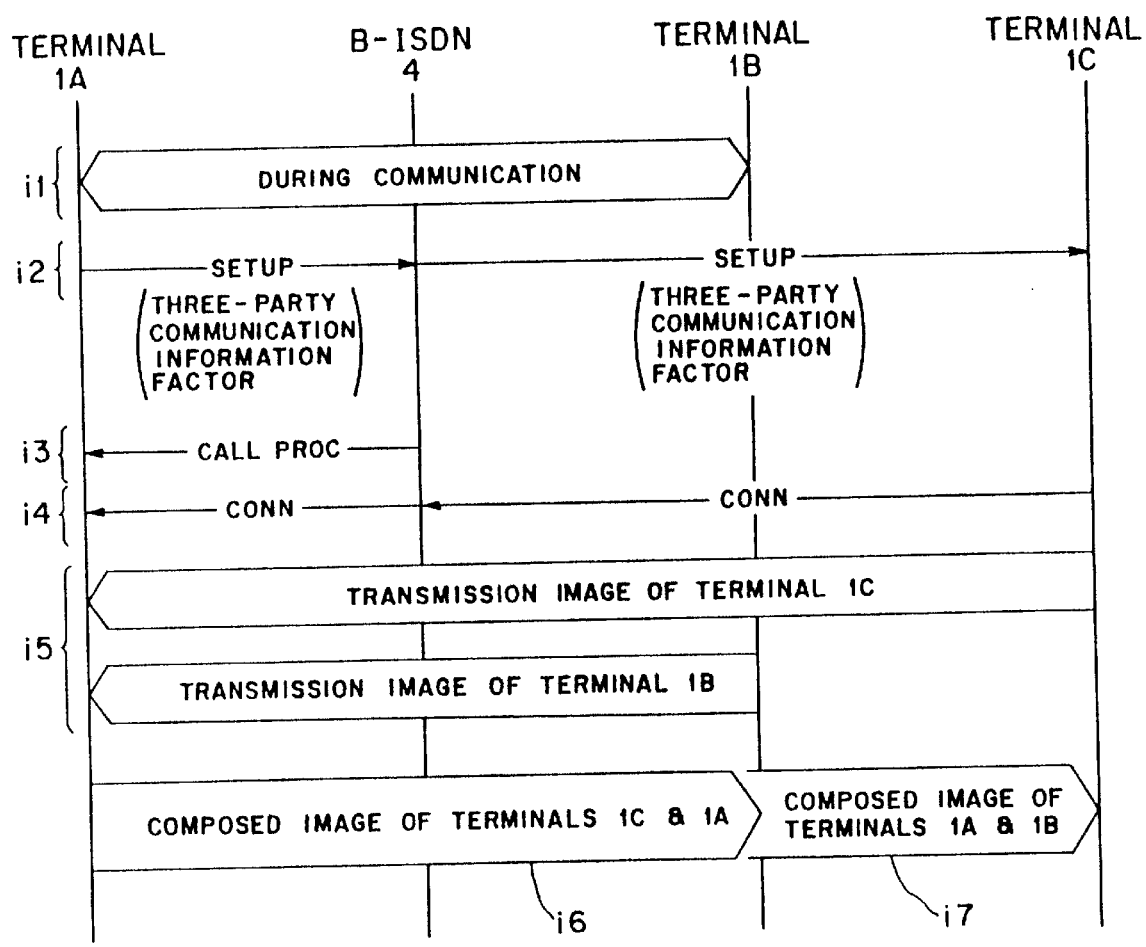
FIG. 22 is a diagram showing another signal sequence illustrating operation of the fourth embodiment.

Upon reception of the SETUP signal, the broadband ISDN 4 (exchange 2) transmits the SETUP signal having the three-party service information factor to the picture phone terminal 1C and then transmits a CALL PROC signal to the picture phone terminal 1A as seen from i3 in FIG. 22.

Then, in response to a reply from the picture phone terminal 1C having received the SETUP signal, a CONN signal is transmitted to the picture phone terminal 1A by way of the broadband ISDN 4 as shown at i4 in FIG. 22. Upon transmission of the CONN signal, a new VCI for transmitting composite image information and sound information composed from image information and sound information from the picture phone terminal 1A and image information and sound information from the picture phone terminal 1B to the picture phone terminal 1C is set.

Thereafter, the image information and the sound information from the picture phone terminal 1C and the image information and the sound information from the picture phone terminal 1B are transmitted to the picture phone terminal 1A as shown at i5 in FIG. 22, similarly as in the case of h5 to h7 of FIG. 21. The image and sound composing section 17 of the picture phone terminal 1A thus composes the image information and the sound information from the picture phone terminal 1B, with which the picture phone terminal 1A is communicating at present, and the image information and the sound information from the picture phone terminal 1C, and the composed information is outputted from the monitor 60 and the loudspeaker 63 of the picture phone terminal 1A. Further, the image and sound composing section 17 of the picture phone terminal 1A composes image information and sound information from the picture phone terminals 1B and 1C and the picture phone terminal 1A itself, that is, image information and sound information from the picture phone terminals 1A and 1C and the picture phone terminals 1A and 1B, and transmits the composite information C+A and A+B to the picture phone terminals 1B and 1C by way of the broadband ISDN 4 as seen from i6 and i7 in FIG. 22. Consequently, a three-party communication condition by the three picture phone terminals 1A to 1C is established, and also in this instance, a composite image of images of the other two picture phone terminals is displayed on the monitor of each of the picture phone terminals 1A to 1C as seen, for example, from FIG. 23(a).

An operation of composing image information and sound information from the terminals 1A to 1C by the picture phone terminal 1A will be described subsequently. As seen from FIG. 19, the picture phone terminal 1A receives ATM cells from the picture phone terminals 1B and 1C having image information and sound information by way of the descending highway from the broadband ISDN 4. The ATM cells are sorted for the picture phone terminals 1B and 1C based on information of the header portions of the ATM cells by the cell sorting section 55.

The cells sorted by the cell sorting section 55 are transmitted to the respective image/sound separating sections 56B and 56C, by which the information of the cells is separated into image information B10 and C10 and sound information B2 and C2. The image information B10 and C10 from the picture phone terminals 1B and 1C separated by the image/sound separating sections 56B and 56C is sent to the frame composing sections 57B and 57C, respectively, by which original frames transmitted from the picture phone terminals 1B and 1C are composed based on the image information B10 and C10, respectively.

Figure 23A:
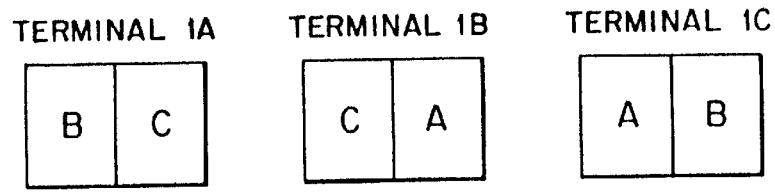
FIGS. 23(a) to 23(d) are diagrammatic views illustrating display images on different terminals.

Then, the images B1 and C1 of the picture phone terminals 1B and 1C composed by the frame composing sections 57B and 57C are composed by the first image composing section 58, and the thus composed image B1+C1 is transmitted by way of the digital to analog converting section 59 to the monitor 60, on which it is displayed as seen, for example, in FIG. 23(a). In this instance, the sound information B2 and C2 from the picture phone terminals 1B and 1C separated by the image/sound separating sections 56B and 56C is composed by the sound composing section 61, and the thus composed sound information B2+C2 is outputted from the loudspeaker 63 by way of the digital to analog converting section 62.

Meanwhile, the sound information A2 from the picture phone terminal 1A is inputted from the microphone 65 by way of the analog to digital converting section 65 into the sound composing section 61, by which the sound information A2 from the picture phone terminal 1A and the sound information B2 and C2 from the image/sound separating sections 56B and 56C are composed into composite sound information C2+A2 and A2+B2 to be transmitted to the picture phone terminals 1B and 1C, respectively.

Further, the image A1 from the picture phone terminal 1A is inputted from the camera 66 by way of the analog to digital converter 67 to the second sound composing section 68, by which the image A1 from the picture phone terminal 1A and the images B1 and C1 from the frame composing sections 57B and 57C are composed into composite images C1+A1 and A1+B1 to be transmitted to the picture phones 1B and 1C, respectively.

Then, the composite images C1+A1 and A1+B1 from the second composing section 68 are decomposed into cells by frame decomposition by the frame decomposing sections 69B and 69C, respectively, and then multiplexed with the composite sound information C2+A2 and A2+B2, respectively, from the sound composing section 61. The thus multiplexed information is outputted as ATM cells from the frame multiplexing section 71 into the highway to the broadband ISDN 4 so that it may be transmitted to the respective picture phone terminals 1B and 1C.

In this manner, in the fourth embodiment of the present invention, when, during communication between two picture phone terminals 1A and 1B, an incoming call from or an outgoing call to a third picture phone terminal 1C is received or delivered and then the call is accepted, at each of the picture phone terminals 1A to 1C, composite information composed from image information and sound information from the other picture phone terminals 1A to 1C is outputted. Consequently, occurrence of ineffective calls can be minimized and the service performance can be improved significantly. Further, multi-party communication such as three-party communication or conference communication can be performed in accordance with an ordinary calling procedure between each of the picture phone terminals 1A to 1C and the broadband ISDN 4, and accordingly, the complexity of software processing at the broadband ISDN 4 (exchange 2) can be avoided advantageously.

E. Fifth Embodiment

Figure 24:
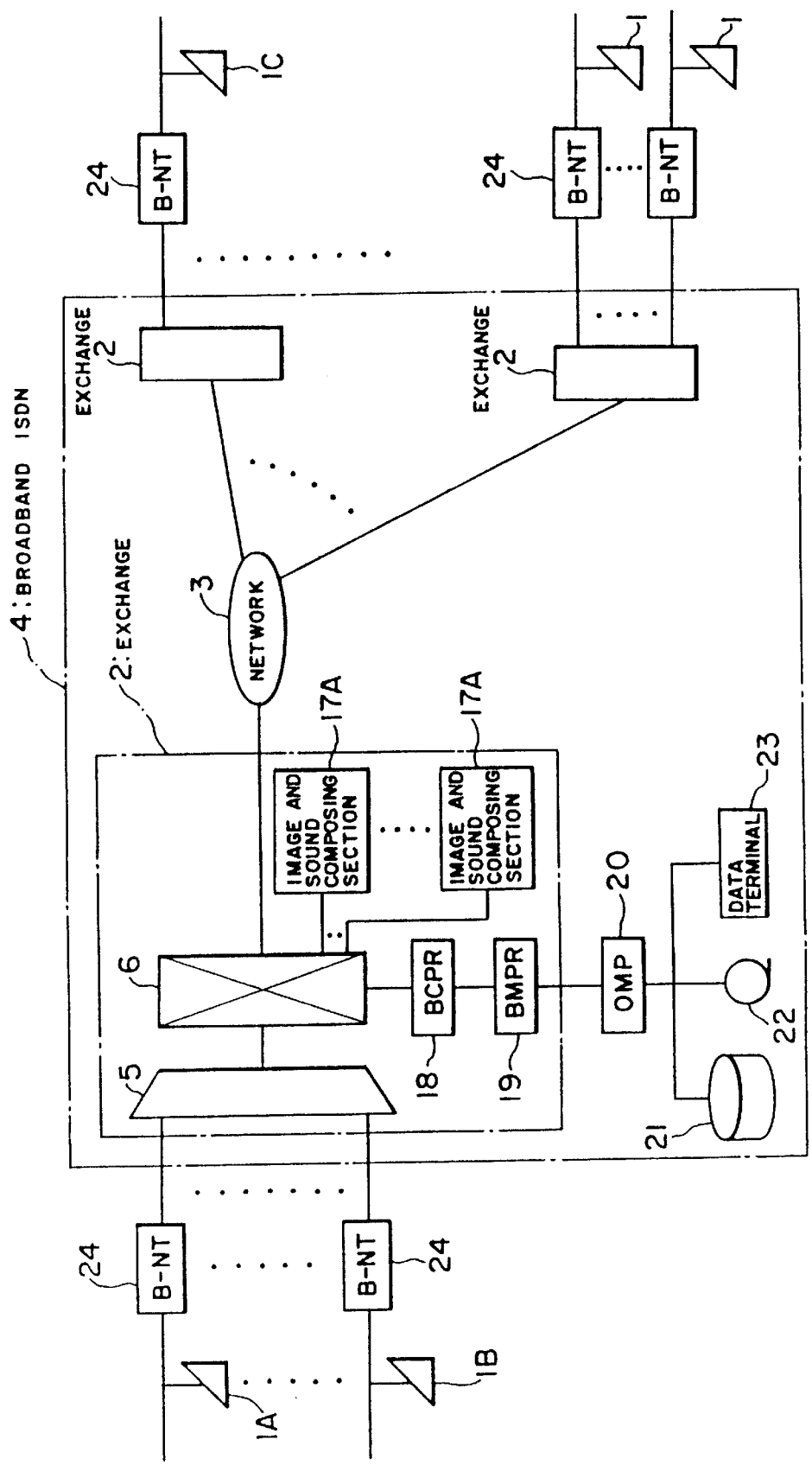
FIG. 24 is a block diagram showing a fifth preferred embodiment of the present invention.
Figure 25:
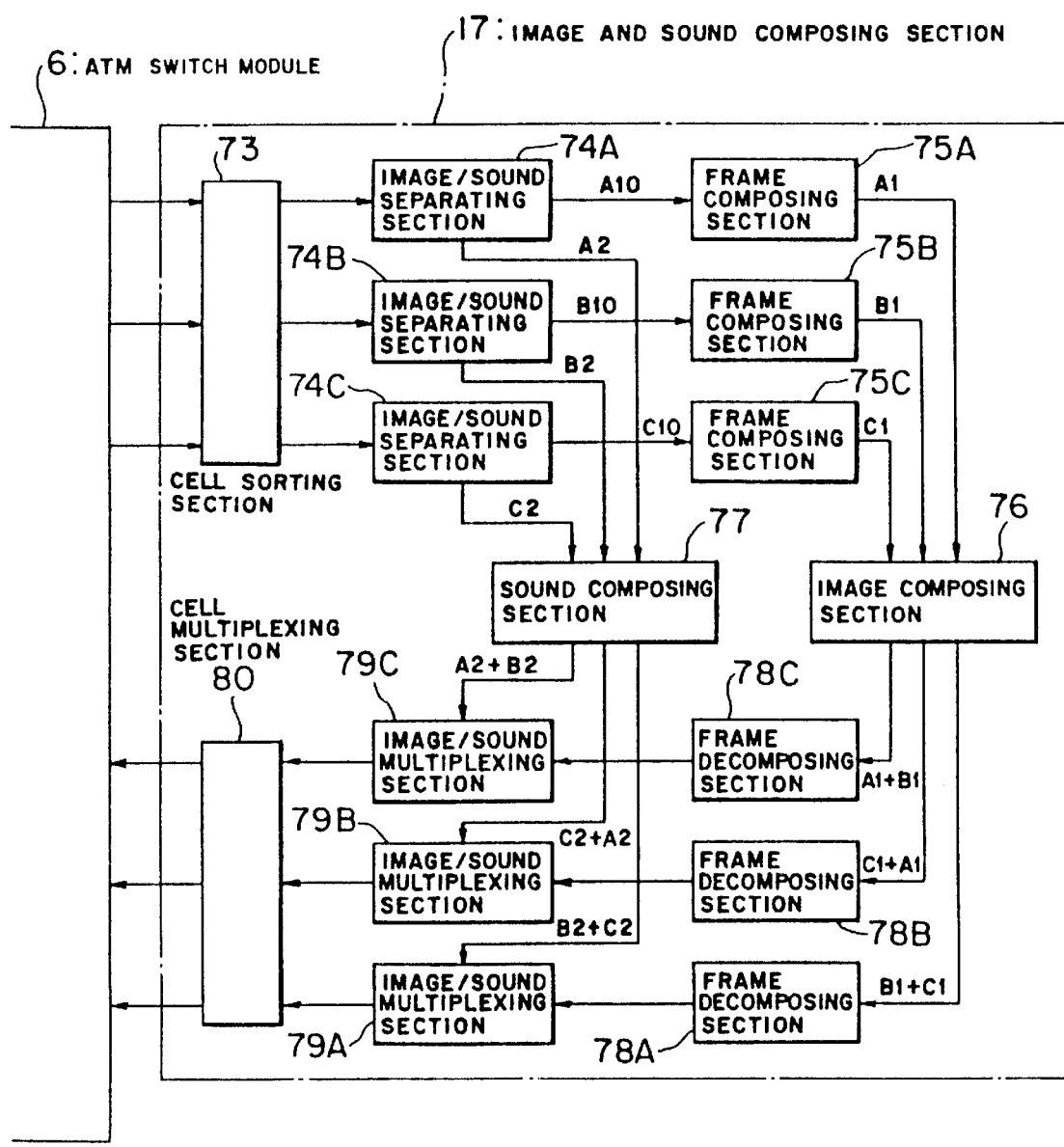
FIG. 25 is a block diagram showing detailed construction of an image and sound composing section in the fifth embodiment.

FIG. 24 shows a fifth preferred embodiment of the present invention, and FIG. 25 shows detailed construction of an image and sound composing section employed in the embodiment of FIG. 24. An image communication system in the present embodiment includes several common components to those of the image communication systems of the first, second and fourth embodiment described hereinabove with reference to FIGS. 2, 11 and 18, respectively. Detailed description of such common components is omitted herein to avoid redundancy.

Referring first to FIG. 24, the image communication system in the present embodiment has somewhat similar construction to that of the fourth embodiment shown in FIG. 18 in that communication among a plurality of picture phone terminals 1 and 1A to 1C can be connected simultaneously by way of the broadband ISDN (ATM network) 4 and a plurality of VCIs (virtual channel identifiers) can be set on lines by ATM cells so that a plurality of calls can be extended to allow multi-party communication. However, while, in the fourth embodiment described above, composition of image information and sound information from the picture phone terminals 1A to 1C is performed by the image and sound composing section 17 provided in the picture phone terminal 1A, in the present fifth embodiment, an image and sound composing section 17A having substantially same functions as those of the image and sound composing section 17 is provided on the exchange 2 side as shown in FIG. 24.

In short, in the present fifth embodiment, a plurality of image and sound composing sections 17A are provided for the ATM switch module 6 of each of the exchanges 2. Each of the image and sound composing sections 17A composes image information and sound information from at least two picture phone terminals (1A to 1C in the present embodiment) in a suitable combination and outputs the composite information to the picture phone terminals 1A to 1C. The image and sound composing sections 17A will be hereinafter described in detail.

It is to be noted that each of the picture phone terminals 1A to 1C can, during communication with another picture phone terminal, deliver an outgoing call to or receive an incoming call from a new third party using a control channel (D channel) of the ATM cell.

Further, in the present embodiments, each of the exchanges 2 includes a plurality of image and sound composing sections 17A so that it can cope with a case wherein a plurality of requests for an interrupt service are developed in a plurality of communications which are being performed by way of the exchange 2.

Each of the image and sound composing sections 17A in the present embodiment is constructed in such a manner as shown in FIG. 25, and operations and operation timings of the individual processing sections of the image and sound composing section 17A are controlled by the BCPR 18.

Referring now to FIG. 25. the image and sound composing section 17A shown includes a cell sorting section 73 connected to the ATM switch module 6 for sorting ATM cells from a plurality of terminals (picture phone terminals 1A to 1C in the present embodiment) for the individual terminals each based on information of the header portion. The image and sound composing section 17A further includes a plurality of image/sound separating sections 74A to 74C each for receiving cells sorted thereto from the cell sorting section 73 for the individual picture phone terminals 1A to 1C and separating the information of the cells into image information A10, B10 and C10 and sound information A2, B2 and C2.

The image and sound composing section 17A further includes a plurality of frame composing sections 75A to 75C for composing original frames (images) A1, B1 and C1 transmitted thereto from the picture phone terminals 1A to 1C based on the image information A10, B10 and C10 from the image and sound separating sections 74A to 74C, and an image composing section 76 which composes the images A1, B1 and C1 from the frame composing sections 75A to 57C into composite images B1+C1, C1+A1 and A1+B1 to be transmitted to the picture phone terminals 1A to 1C, respectively.

The image and sound composing section 17A further includes a sound composing section 77 which composes sound information A2, B2 and C2 from the image/sound separating sections 74A to 74C into composite sound information B2+C2, C2+A2 and A2+B2 to be transmitted to the picture phone terminals 1A to 1C, respectively.

The image and sound composing section 17A further includes a plurality of frame decomposing sections 78A to 78C for receiving composite images B1+C1, C1+A1 and A1+B1, respectively, from the image composing section 76 and decomposing frames of the composite signals into cells, a plurality of image and sound multiplexing sections 79A to 79C for multiplexing image information from the frame decomposing sections 78A to 78C and composite sound information from the sound composing section 77 to obtain cells to be transmitted to the respective picture phone terminals 1A to 1C, and a cell multiplexing section 80 for multiplexing the cells from the image and sound multiplexing sections 79A to 79C and outputting the thus multiplexed cells to the ATM switch module 6.

Operation of the image communication system of the present fifth embodiment constructed as described above when the picture phone terminal 1A receives, during communication with the picture phone terminal 1B, an incoming call from a third picture phone terminal 1C and accepts the interrupting incoming call from the picture phone terminal 1C will be described subsequently with reference to FIGS. 24 and 26. When an incoming call (SETUP signal) is received, during communication between the picture phone terminals 1A and 1B as shown at j1 in FIG. 26, from the third picture phone terminal 1C, the exchange 2 transmits the SETUP signal to the picture phone terminal 1A as shown at j2 in FIG. 26 and then transmits a CALL PROC signal to the picture phone terminal 1C as shown at j3 in FIG. 26.

Figure 26:
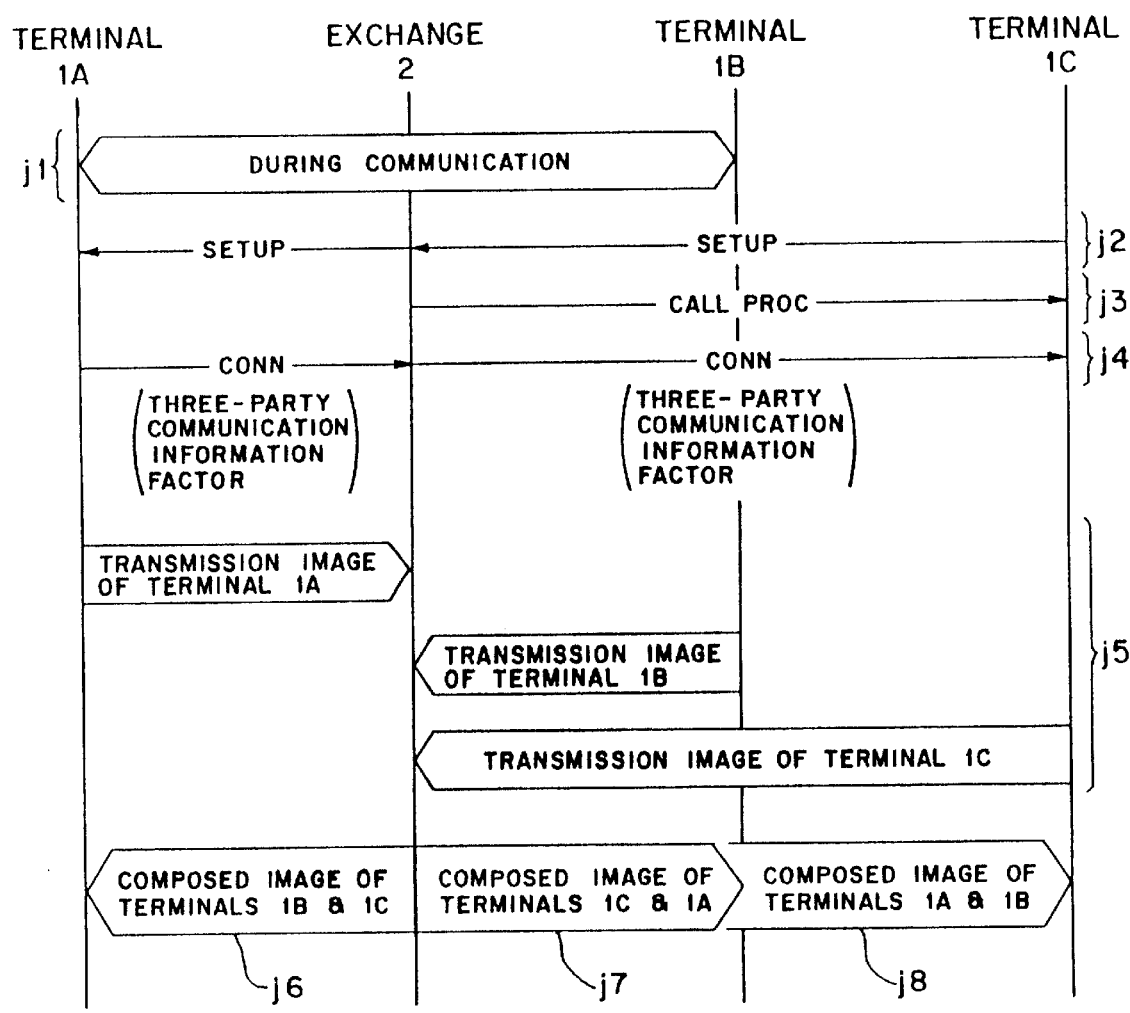
FIG. 26 is a diagram showing a signal sequence illustrating operation of the fifth embodiment.

Then, in response to a reply from the picture phone terminal 1A having received the SETUP signal, a CONN signal having a three-party communication information factor is transmitted to the picture phone terminal 1C by way of the broadband ISDN 4 as shown at j4 in FIG. 26. Upon transmission of the CONN signal, a new VCI for transmitting composite image information and sound information composed from image information and sound information from the picture phone terminal 1A and image information and sound information from the picture phone terminal 1B to the picture phone terminal 1C is set.

Thereafter, the image information and the sound information from the picture phone terminals 1A to 1C are transmitted to the exchange 2 as shown at j5 in FIG. 26. The image and sound composing section 17A of the exchange 2 thus composes, for each of the picture phone terminals 1A to 1C, the image information and the sound information from the other picture phone terminals 1B and 1C, 1C and 1A, and 1A and 1B. The thus obtained composite information B+C, C+A and A+B is transmitted to the picture phone terminals 1A to 1C, respectively, by way of the broadband ISDN 4 as seen from j6, j7 and j8 in FIG. 26. Consequently, a three-party communication condition by the three picture phone terminals 1A to 1C is established, and a composite image composed from images of the other two picture phone terminals is displayed on the monitor of each of the picture phone terminals 1A to 1C as seen, for example, from FIG. 23(a), similarly as in the fourth embodiment.

Another operation of the image communication system of the present embodiment when the picture phone terminal 1A delivers, during communication with the picture phone terminal 1B, an outgoing call to a third picture phone terminal 1C and the picture phone terminal 1C accepts the incoming call from the picture phone terminal 1A will be described subsequently with reference to FIGS. 24 and 27. When the picture phone terminal 1A develops, during communication with the picture phone terminal 1B as seen from k1 in FIG. 27, an outgoing call to the picture phone terminal 1C, the picture phone terminal 1A transmits a SETUP signal having a three-party communication information factor to the exchange 2 as seen from k2 in FIG. 27.

Figure 27:
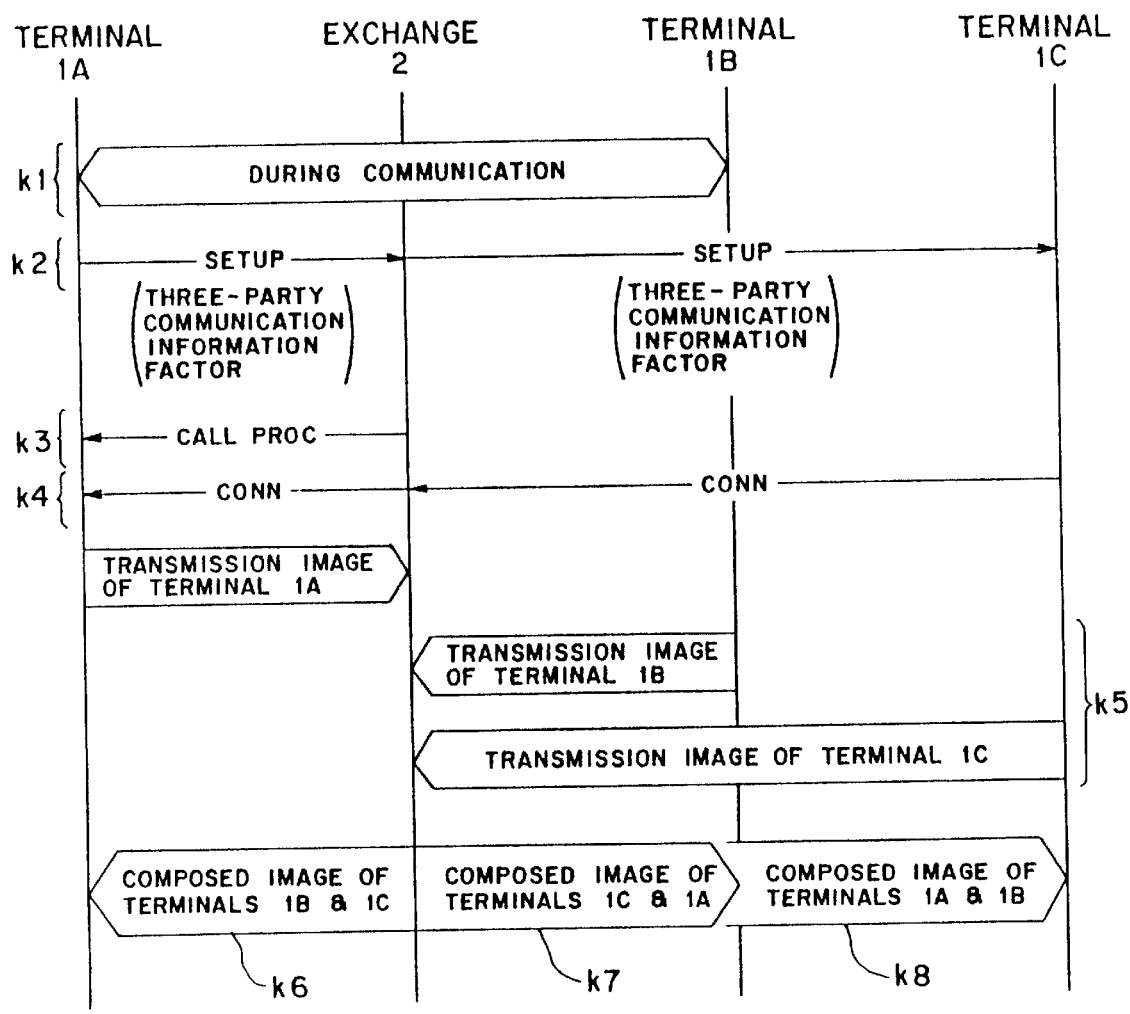
FIG. 27 is a diagram showing another signal sequence illustrating operation of the fifth embodiment.

Upon reception of the SETUP signal, the exchange 2 transmits the SETUP signal having the three-party service information factor to the picture phone terminal 1C and then transmits a CALL PROC signal to the picture phone terminal 1A as seen from k3 in FIG.27.

Then, in response to a reply from the picture phone terminal 1C having received the SETUP signal, a CONN signal is transmitted to the picture phone terminal 1A by way of the broadband ISDN 4 as shown at k4 in FIG. 27. Upon transmission of the CONN signal, a new VCI for transmitting composite image information and sound information composed from image information and sound information from the picture phone terminal 1A and image information and sound information from the picture phone terminal 1B to the picture phone terminal 1C is set.

Thereafter, the image information and the sound information from the picture phone terminals 1A to 1C are transmitted to the exchange 2 as shown at k5 in FIG. 27. The image and sound composing section 17A of the exchange 2 thus composes, for each of the picture phone terminals 1A to 1C, the image information and the sound information from the other picture phone terminals 1B and 1C, 1C and 1A, and 1A and 1B. The thus obtained composite information B+C, C+A and A+B is transmitted to the picture phone terminals 1A to 1C, respectively, by way of the broadband ISDN 4 as seen from k6 to k8 in FIG. 27. The processing at k5 to k8 described just above is similar to that at j5 to j8 of FIG. 26. Consequently, a three-party communication condition by the three picture phone terminals 1A to 1C is established, and also in this instance, a composite image composed from images of the other two picture terminals is displayed on the monitor of each of the picture phone terminals 1A to 1C as seen, for example, from FIG. 23(a).

An operation of composing image information and sound information from the terminals 1A to 1C by the image and sound composing section 17A of the exchange 2 will be described subsequently. As seen from FIG. 25, the image and sound composing section 17A of the exchange 2 receives ATM cells from the picture phone terminals 1A to 1C by way of the ATM switch module 6. The ATM cells are sorted for the picture phone terminals 1A to 1C based on information of the header portions of the ATM cells by the cell sorting section 73.

The cells sorted by the cell sorting section 73 are transmitted to the respective image/sound separating sections 74A to 74C, by which the information of the cells is separated into image information A10, B10 and C10 and sound information A2, B2 and C2. The image information A10, B10 and C10 from the picture phone terminals 1A to 1C separated by the image/sound separating sections 74A to 74C is sent to the frame composing sections 75A to 75C, respectively, by which original frames (images) transmitted from the picture phone terminals 1A to 1C are composed based on the image information A10, B10 and C10, respectively.

Then, the images A1 to C1 of the picture phone terminals 1A to 1C composed by the frame composing sections 75A to 75C are inputted to the image composing section 76, by which they are composed into composite images B1+C1, C1+A1 and A1+B1 to be transmitted to the picture phone terminals 1A to 1C, respectively.

Meanwhile, the sound information A2, B2 and C2 separated by the image/sound separating sections 74A to 74C are inputted into the sound composing section 77, by which the sound information A2, B2 and C2 is composed into composite sound information B2+C2, C2+A2 and A2+B2 to be transmitted to the picture phone terminals 1A to 1C, respectively.

Thereafter, the composite images B1+C1, C1+A1 and A1+B1 from the image composing section 76 are decomposed into cells by frame decomposition by the frame decomposing sections 78A to 78C, respectively, and then multiplexed with the composite sound information B2+C2, C2+A2 and A2+B2 from the sound composing section 77 by the image and sound multiplexing sections 79A to 79C, respectively. The thus multiplexed information is outputted as ATM cells from the frame multiplexing section 80 to the ATM switch module 6 so that it may be transmitted to the respective picture phone terminals 1A to 1C.

In this manner, also with the fifth embodiment of the present invention, similar advantages to those of the fourth embodiment described above can be obtained. In addition, in the present fifth embodiment, since the image and sound composing section 17A is provided on the exchange 2 side, a multi-party communication service can be realized without adding new special elements to the picture phone terminals 1A to 1C.

Figure 23B:
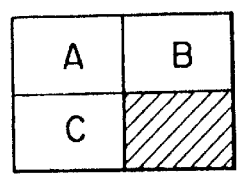

It is to be noted that, while, in the fourth and fifth embodiments described above, each of the picture phone terminals 1A to 1C displays, on the monitor thereof, composite information composed from image information of the other two picture phone terminals 1A to 1C as seen from FIG. 23(a), when three-party communication is performed, also image information of the picture phone terminal itself may be composed so that all of the images A to C from the picture phone terminals 1A to 1C may be displayed on all of the monitors as seen from FIG. 23(b).

Figure 23C:
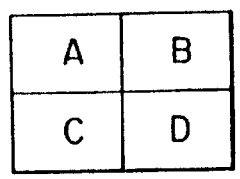
Figure 23D:
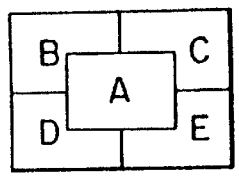

Further, while, in the fourth and fifth embodiments described above, three-party communication is performed, the system of the present invention is not limited to the specific communication, but can be applied similarly to another case wherein multi-party communication is performed among four or more parties. In this instance, for example, in the case of four-party communication based on image information A to D, the display of the monitor of each of the picture phone terminals may be such, for example, as shown in FIG. 23(c), and, for example, in the case of five-party communication based on image information A to E, the display of the monitor of each of the picture phone terminals may be such, for example, as shown in FIG. 23(d).

The present invention is not limited to the specifically described embodiments, and variations and modifications may be made without departing from the scope of the present invention.

What is claimed is:

1. A picture phone terminal comprising:

means for establishing a call connection with another picture phone terminal;

a controller for setting a standby condition in response to communication holding standby information from said another picture phone terminal to which a call connection has been established;

a generator for generating communication disconnection notifying information including a message representing that said call connection to said another picture phone terminal should be terminated, as image information;

a transmitter for transmitting the communication disconnection notifying information to said another picture phone terminal; and wherein said transmitter causes the communication disconnection notifying information to include image information from yet another picture phone terminal which is communicating with said another picture phone terminal so as to allow a composite image information obtained by inclusion of said image information from said yet another picture phone terminal to be displayed on said another picture phone terminal after said another picture terminal ends the communication with said yet another picture terminal.

2. The picture phone terminal as claimed in claim 1, further comprising means for adding a message requesting that said another picture phone terminal should re-establish connection with said picture phone terminal, to the communication disconnection notifying information, wherein said transmitter transmits the added message together with the communication disconnection notifying information to said another picture phone terminal.

3. A picture phone terminal comprising:

means for establishing a call connection with another picture phone terminal;

a controller for setting a standby condition in response to communication holding standby information from said another picture phone terminal to which a call connection has been established;

a generator for generating communication disconnection notifying information including a message representing that said call connection to said another picture phone terminal should be terminated, as image information;

a transmitter for transmitting the communication disconnection notifying information to said another picture phone terminal; and wherein said transmitter causes the communication disconnection notifying information to be stored into said another picture phone terminal so as to allow said another picture phone terminal to display the communication disconnection notifying information after said another picture phone terminal ends the communication with yet another picture phone terminal.

4. The picture phone terminal as claimed in claim 3, further comprising means for adding a message requesting that said another picture phone terminal should re-establish connection with said picture phone terminal, to the communication disconnection notifying information, wherein said transmitter transmits the added message together with the communication disconnection notifying information to said another picture phone terminal.

5. A communication disconnection notifying method for setting a first picture phone terminal to a standby condition in response to a communication holding standby information from a second picture phone terminal to which a call connection has been established, the method comprising the steps of:

generating communication disconnection notifying information including a message representing that a call connection between said first and second picture phone terminal should be terminated as image information at the first picture phone terminal; and transmitting the communication disconnection notifying information from the first picture phone terminal to the second picture phone terminal; and wherein the communication disconnection notifying information includes image information from a third picture phone terminal which is communicating with said second picture phone terminal so as to allow the composite image information to be displayed on said second picture phone terminal after said second picture phone terminal ends the communication with said third picture phone terminal.

6. The communication disconnection notifying method as claimed in claim 5, wherein a message requesting that said second picture phone terminal should re-establish connection with said first picture phone terminal is added to the communication disconnection notifying information at said first picture phone terminal and transmitted together with the communication disconnection notifying information from said first picture phone terminal to said second picture phone terminal.

7. A communication disconnection notifying method for setting a first picture phone terminal to a standby condition in response to a communication holding standby information from a second picture phone terminal to which a call connection has been established, the method comprising the steps of:

generating communication disconnection notifying information including a message representing that a call connection between said first and second picture phone terminal should be terminated as image information at the first picture phone terminal; and transmitting the communication disconnection notifying information from the first picture phone terminal to the second picture phone terminal, and wherein the communication disconnection notifying information is stored into said second picture phone terminal so as to allow said second picture phone terminal to display the communication disconnection notifying information after said second picture phone terminal ends the communication with a third picture phone terminal.

8. The communication disconnection notifying method as claimed in claim 7, wherein a message requesting that said second picture phone terminal should re-establish connection with said first picture phone terminal is added to the communication disconnection notifying information at said first picture phone terminal and transmitted together with the communication disconnection notifying information from said first picture phone terminal to said second picture phone terminal.

9. A picture phone terminal comprising:

means for establishing call connections with another picture phone terminal and yet another picture phone terminal;

a generator for generating a communication holding standby information instructing to put said another picture phone terminal into a standby condition;

a transmitter for transmitting the communication holding standby information to said another picture phone terminal to put said another picture phone terminal into the standby condition;

means for communicating with said yet another picture phone terminal in a condition that said another picture phone terminal is being put into the standby condition;

a receiver for receiving a communication disconnection notifying information including a message representing that the call connection should be terminated and a message requesting to re-establish connection with said another picture phone terminal, from said another picture phone terminal which is being put into the standby condition;

a storage for storing the communication disconnection notifying information received by said receiver in communicating with said yet another picture phone terminal;

an image circuit for composing the communication disconnection notifying information stored in said storage after the communication with said yet another picture phone terminal has been ended; and a display for displaying the composed communication disconnection notifying information.

* * * * *